United States Patent
Sanogo et al.

(10) Patent No.: US 11,998,996 B2
(45) Date of Patent: Jun. 4, 2024

(54) HOLE CUTTING ACCESSORY FOR POWER TOOL

(71) Applicant: Black & Decker Inc., New Britain, CT (US)

(72) Inventors: Poinon Z. Sanogo, Enfield, CT (US); Matthew Christopher Green, Amherst, MA (US); Kenneth Hall, East Longmeadow, MA (US); Joseph T. Novak, East Longmeadow, MA (US); Andrew Reist, Springfield, MA (US)

(73) Assignee: BLACK & DECKER INC., New Britain, CT (US)

( * ) Notice: Subject to any disclaimer, the term of this patent is extended or adjusted under 35 U.S.C. 154(b) by 42 days.

(21) Appl. No.: 17/654,493

(22) Filed: Mar. 11, 2022

(65) Prior Publication Data

US 2022/0297205 A1 Sep. 22, 2022

Related U.S. Application Data

(60) Provisional application No. 63/263,113, filed on Oct. 27, 2021, provisional application No. 63/200,652, filed on Mar. 19, 2021.

(51) Int. Cl.
B23B 51/04 (2006.01)
(52) U.S. Cl.
CPC ...... B23B 51/0426 (2013.01); B23B 51/0473 (2013.01)
(58) Field of Classification Search
CPC .................. B23B 51/0426; B23B 51/0473
See application file for complete search history.

(56) References Cited

U.S. PATENT DOCUMENTS

| 4,036,560 | A | * | 7/1977 | Clark | B23B 51/0473 144/23 |
| 4,148,593 | A | * | 4/1979 | Clark | B23B 51/0473 408/206 |
| 5,226,762 | A | * | 7/1993 | Ecker | B23B 51/0473 408/209 |
| 5,246,317 | A | * | 9/1993 | Koetsch | B23B 51/0473 408/209 |
| 5,417,527 | A | | 5/1995 | Wienhold | |
| 5,435,672 | A | | 7/1995 | Hall et al. | |
| 6,623,220 | B2 | | 9/2003 | Nuss et al. | |

(Continued)

FOREIGN PATENT DOCUMENTS

| CN | 106902261 A | 6/2017 |
| CN | 106903351 A | 6/2017 |

(Continued)

OTHER PUBLICATIONS

EP Search Report for EP Application No. 22162509.8 dated Oct. 12, 2022, 8 pages.

*Primary Examiner* — Eric A. Gates
(74) *Attorney, Agent, or Firm* — Brake Hughes Bellermann LLP

(57) ABSTRACT

A hole cutting accessory for a power-driven tool may include an arbor that provides for quick release of an annular saw blade component of the accessory, and for quick release of a pilot drill bit component of the accessory. The quick release of the annular saw blade component from the arbor may be accomplished separately from the quick release of the pilot drill bit component from the arbor.

18 Claims, 31 Drawing Sheets

(56) References Cited

U.S. PATENT DOCUMENTS

| | | |
|---|---|---|
| 6,705,807 B1 | 3/2004 | Rudolph et al. |
| 7,104,738 B2 | 9/2006 | Cantlon |
| 7,621,703 B2 | 11/2009 | Keightley |
| 7,766,585 B2 | 8/2010 | Vasudeva et al. |
| 7,824,137 B2 | 11/2010 | Vasudeva et al. |
| 8,016,523 B2 | 9/2011 | Vasudeva et al. |
| 8,147,173 B2 | 4/2012 | Goetz et al. |
| 8,328,474 B2 | 12/2012 | Pangerc et al. |
| 8,366,356 B2 * | 2/2013 | Novak ............... B23B 51/0473 408/239 R |
| 8,721,236 B2 * | 5/2014 | Kazda ............... B23B 51/0473 408/239 R |
| 9,022,703 B2 | 5/2015 | Keightley |
| 9,108,255 B2 | 8/2015 | Li |
| 9,144,847 B2 | 9/2015 | Tseng |
| 9,233,424 B2 | 1/2016 | Grolimund et al. |
| 9,233,434 B2 | 1/2016 | Keen |
| 9,248,513 B2 | 2/2016 | Lai |
| 9,254,525 B2 | 2/2016 | Mizoguchi |
| RE46,103 E * | 8/2016 | Novak ............... B23B 51/0473 |
| 9,486,860 B2 | 11/2016 | Kazda et al. |
| 9,999,968 B2 | 6/2018 | Selvanayagam et al. |
| 10,532,412 B2 | 1/2020 | Ward |
| 10,549,357 B2 | 2/2020 | Grolimund et al. |
| 10,661,354 B2 | 5/2020 | Grindlund et al. |
| 11,045,881 B2 | 6/2021 | Balen |
| 2002/0122703 A1 | 9/2002 | Czyzewski et al. |
| 2009/0226270 A1 | 9/2009 | Novak et al. |
| 2011/0255931 A1 | 10/2011 | Murdie et al. |
| 2019/0151959 A1 | 5/2019 | Ho |
| 2020/0086395 A1 | 3/2020 | Balen |
| 2020/0238395 A1 | 7/2020 | Stoker |

FOREIGN PATENT DOCUMENTS

| | | | |
|---|---|---|---|
| DE | 20113578 U1 | 10/2001 | |
| EP | 2502693 A1 | 9/2012 | |
| EP | 3181275 A1 | 6/2017 | |
| EP | 4086027 A1 | 11/2022 | |
| WO | 0138028 A1 | 5/2001 | |
| WO | WO-2004011179 A1 * | 2/2004 | ............ B23B 31/11 |
| WO | 2009021278 A1 | 2/2009 | |
| WO | 2019239336 A1 | 12/2019 | |

* cited by examiner

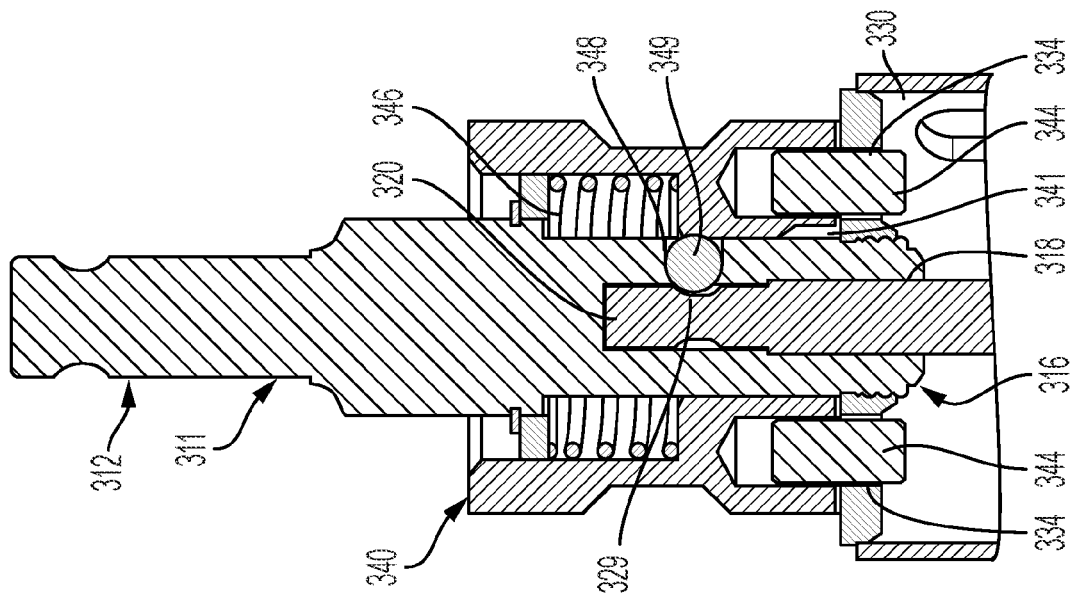
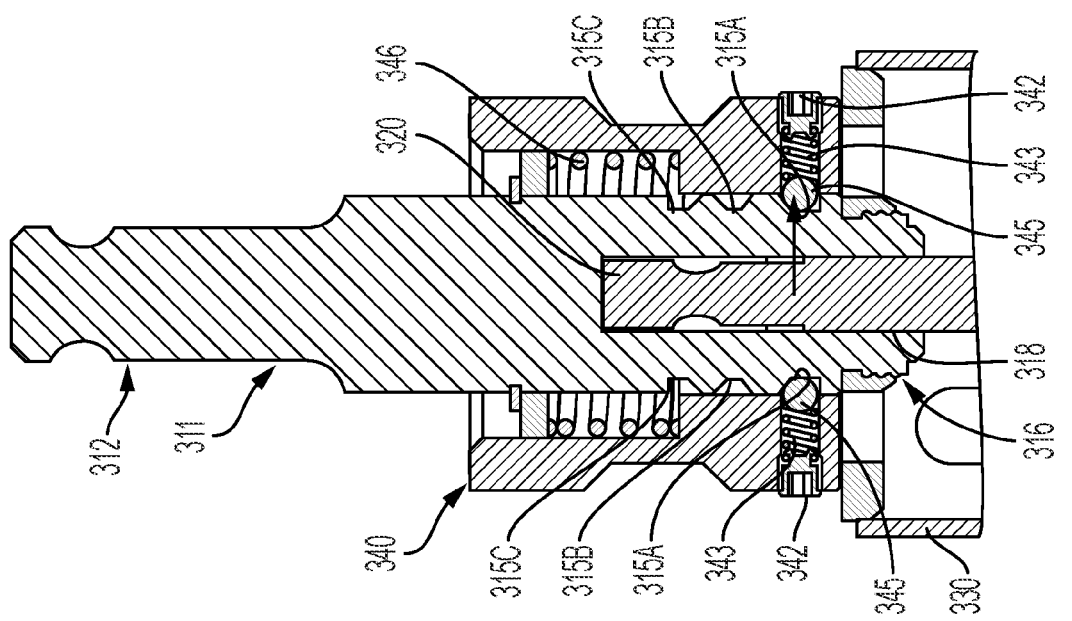
FIG. 4A(1)
FIG. 4A(2)

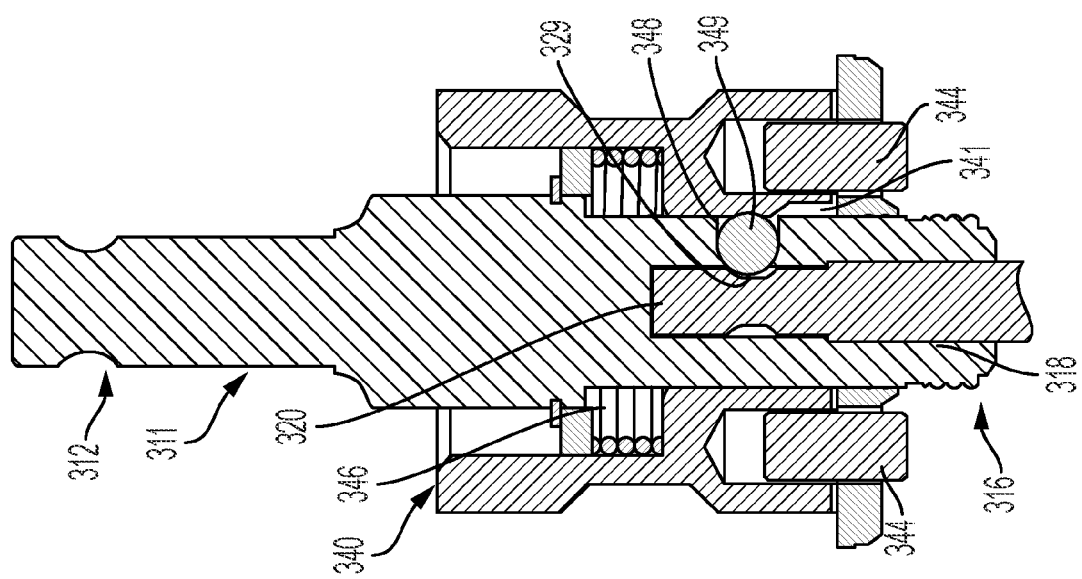
FIG. 4B(2)
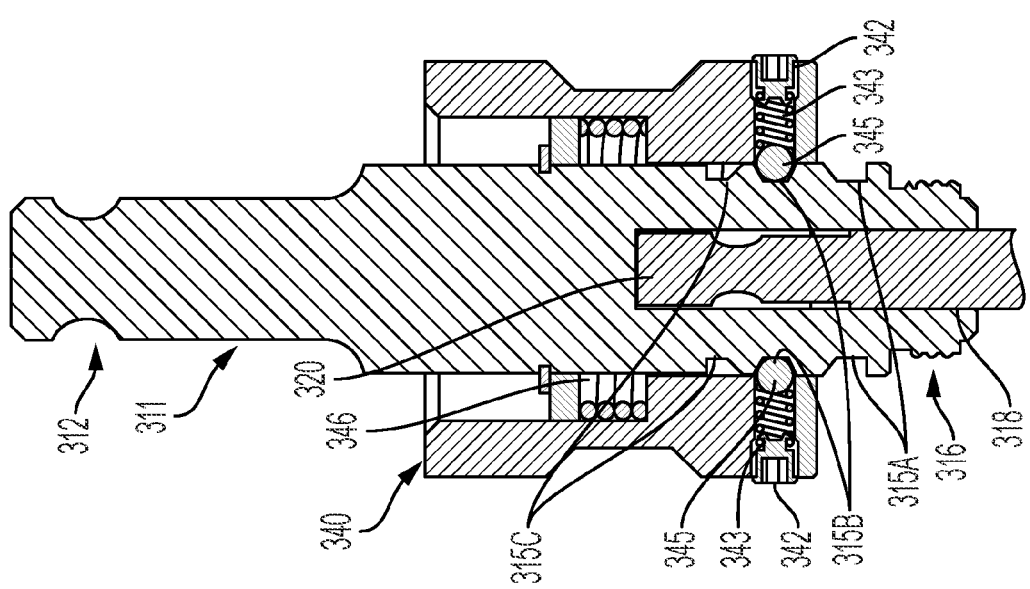
FIG. 4B(1)

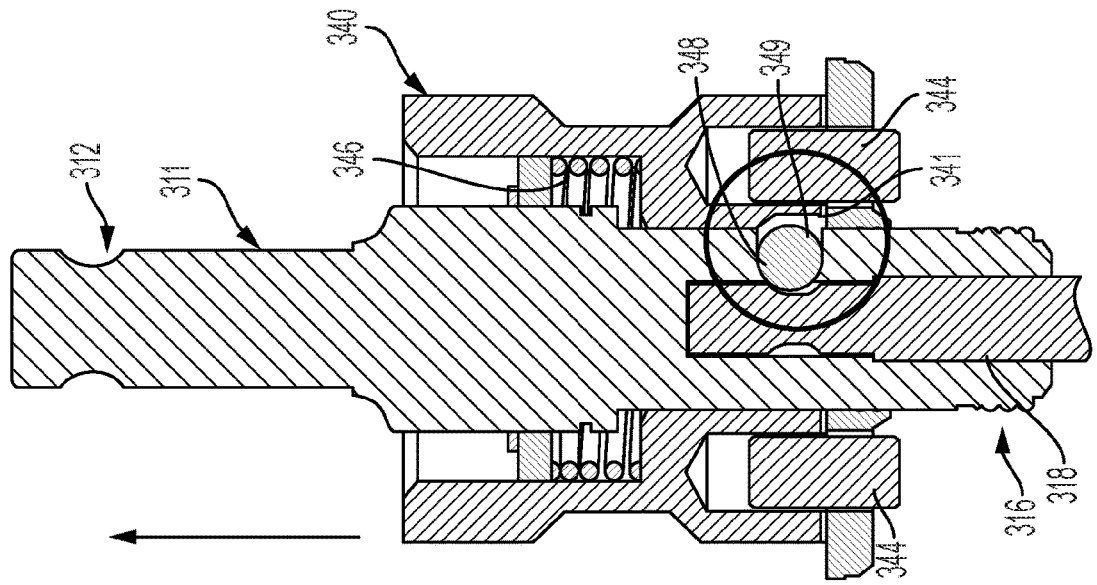
FIG. 4C(2)
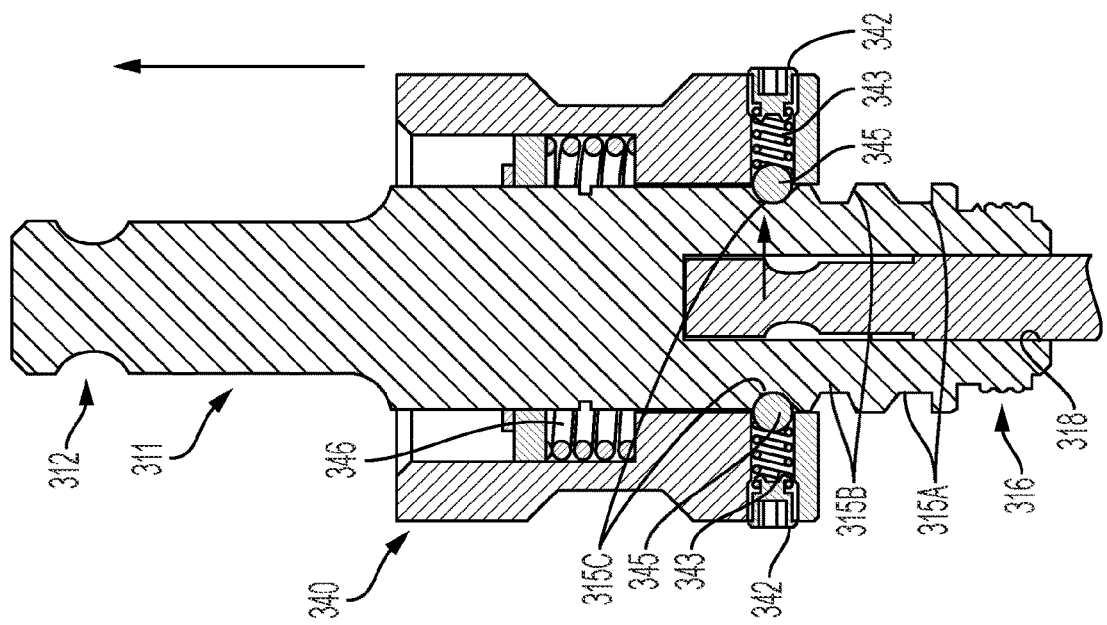
FIG. 4C(1)

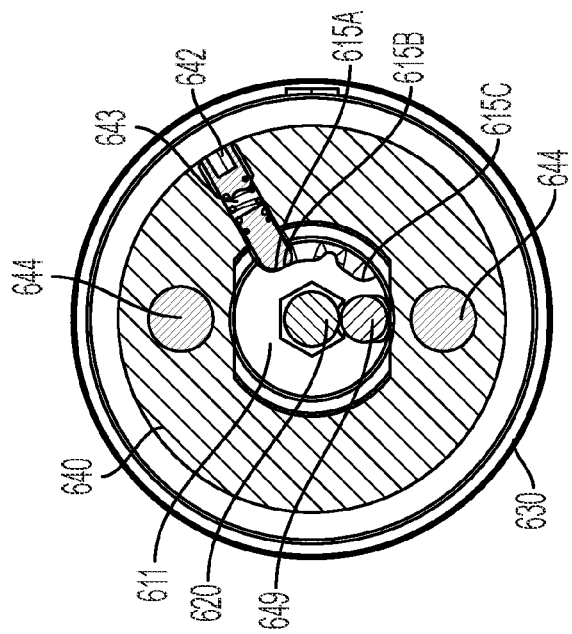
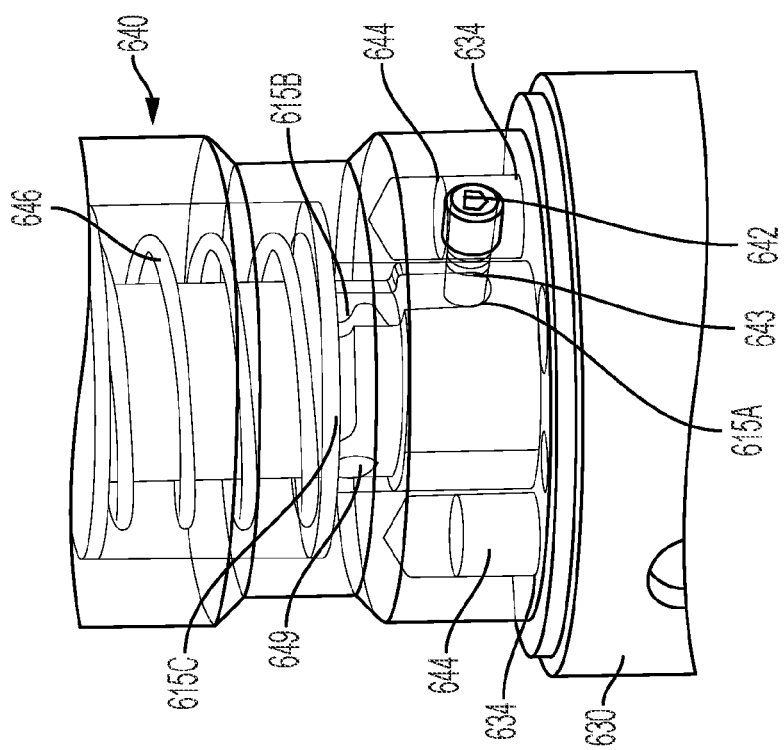
FIG. 7A(2)
FIG. 7A(1)

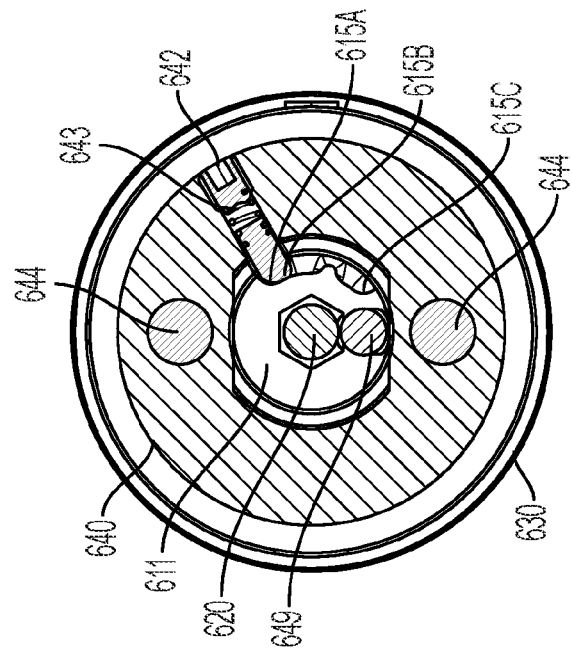
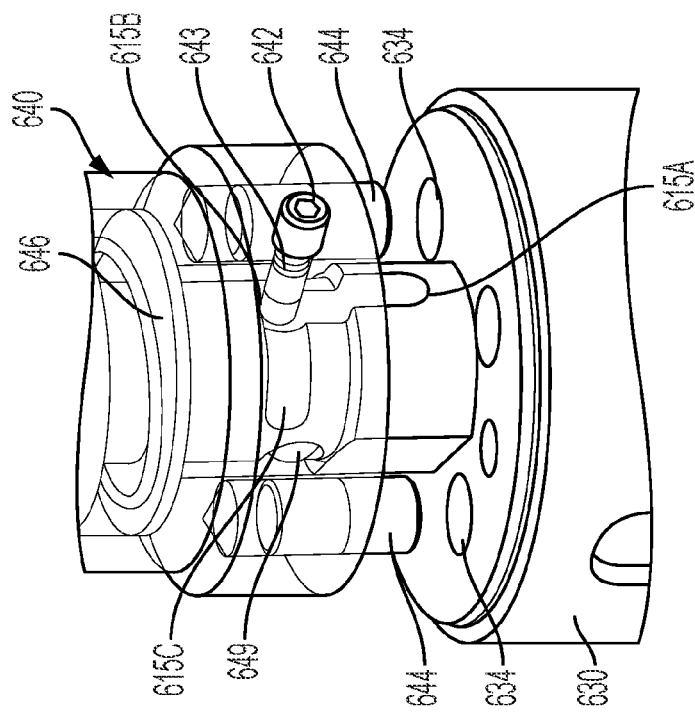
FIG. 7B(2)
FIG. 7B(1)

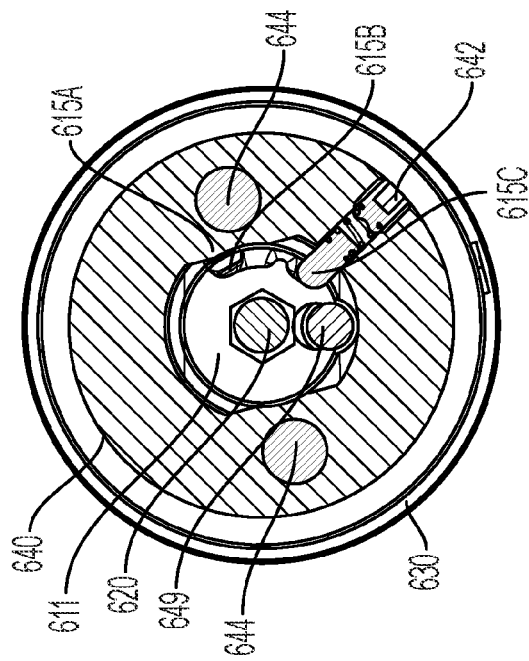
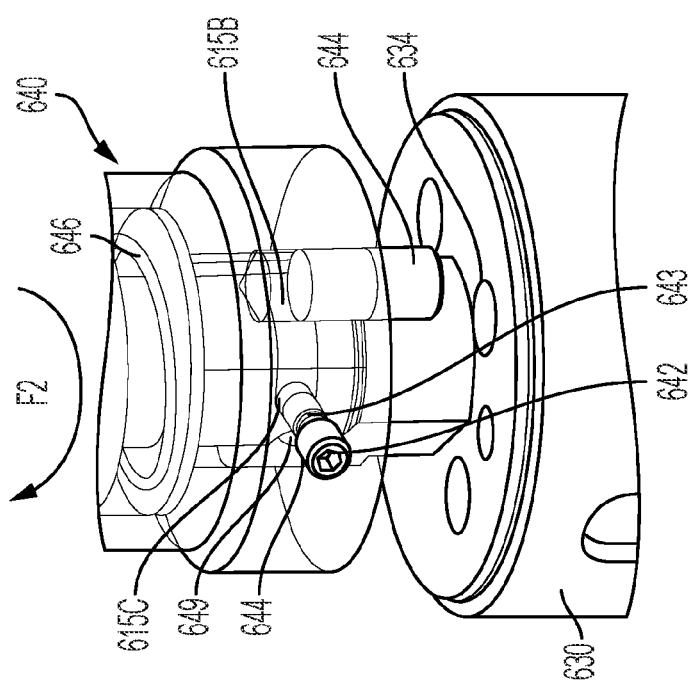
FIG. 7C(2)
FIG. 7C(1)

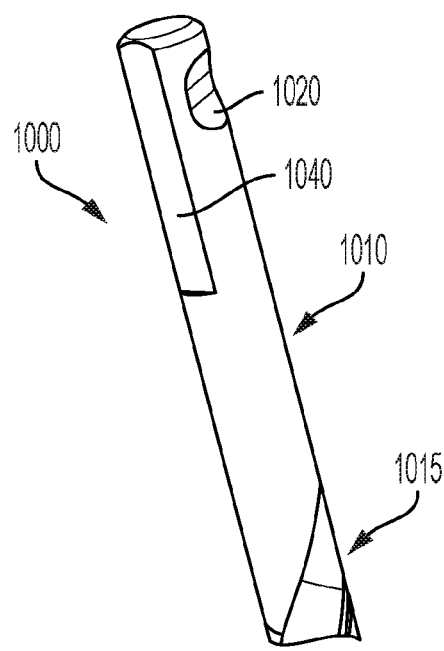
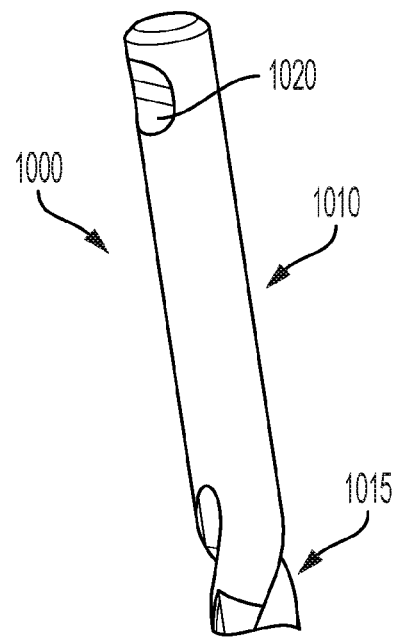
FIG. 10A  FIG. 10B
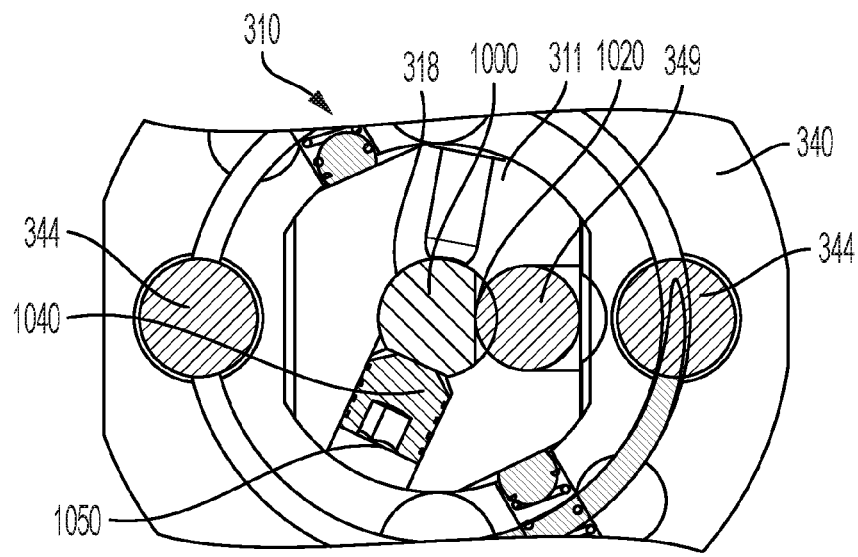
FIG. 10C

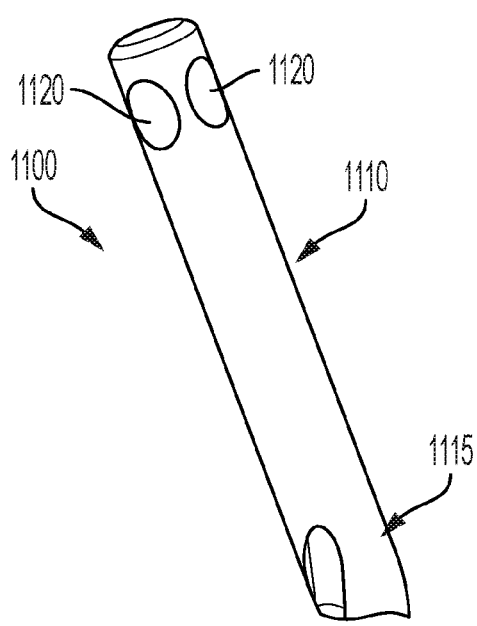
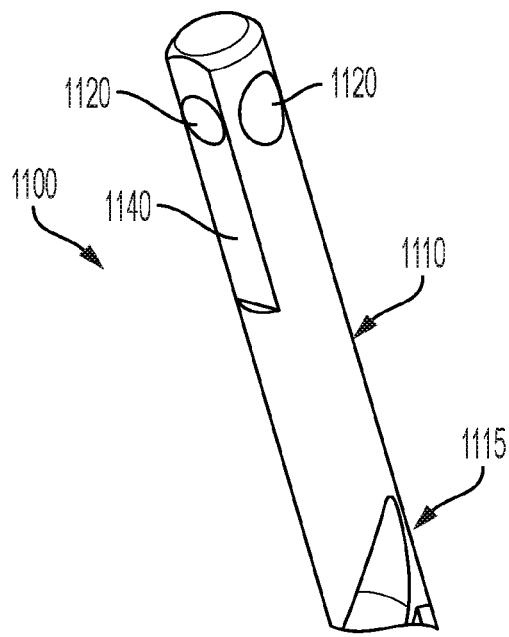
FIG. 11A   FIG. 11B
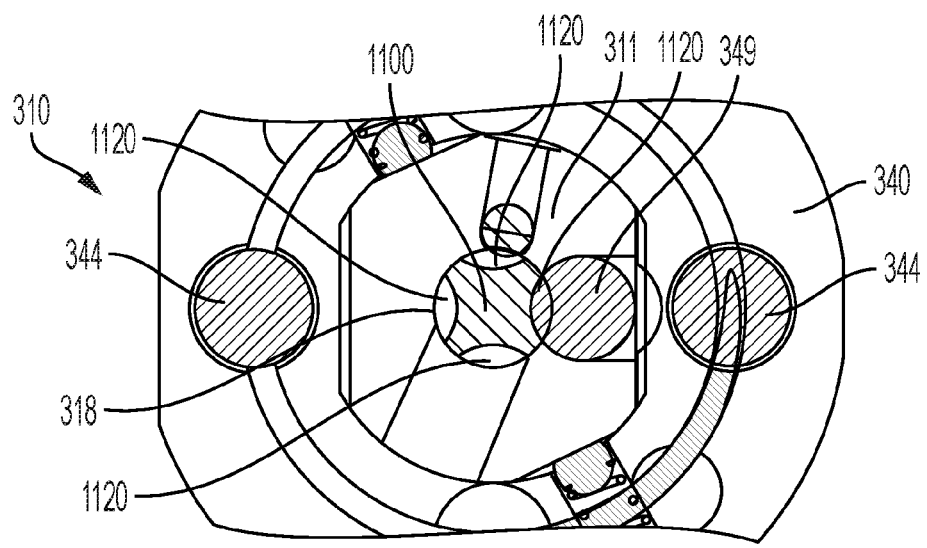
FIG. 11C

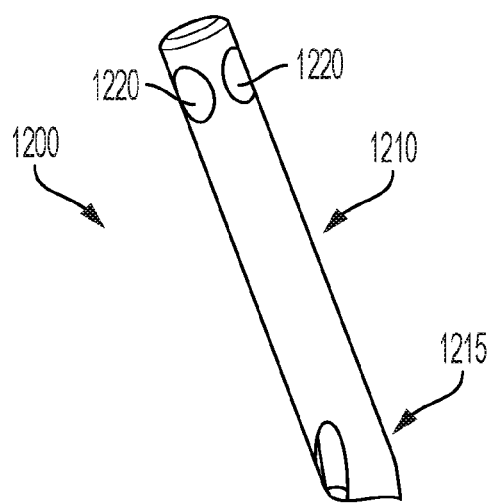 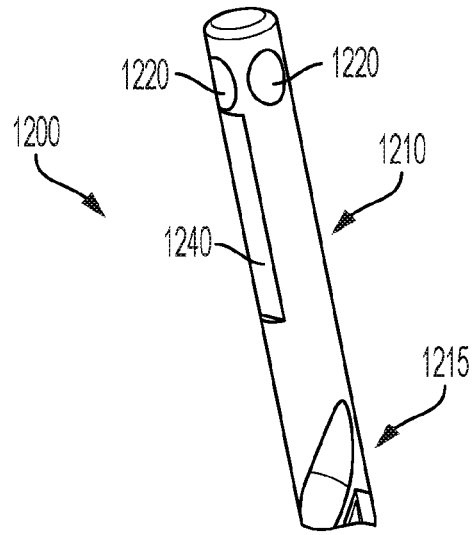
FIG. 12A    FIG. 12B
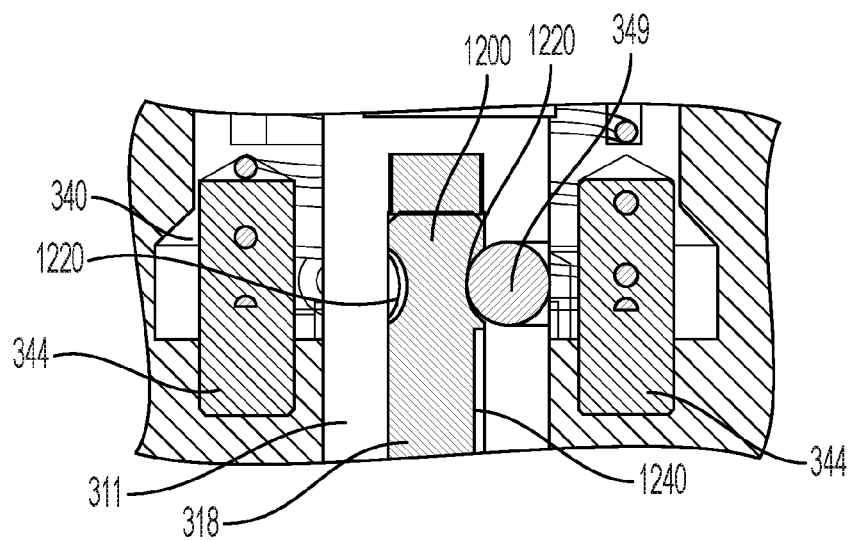
FIG. 12C

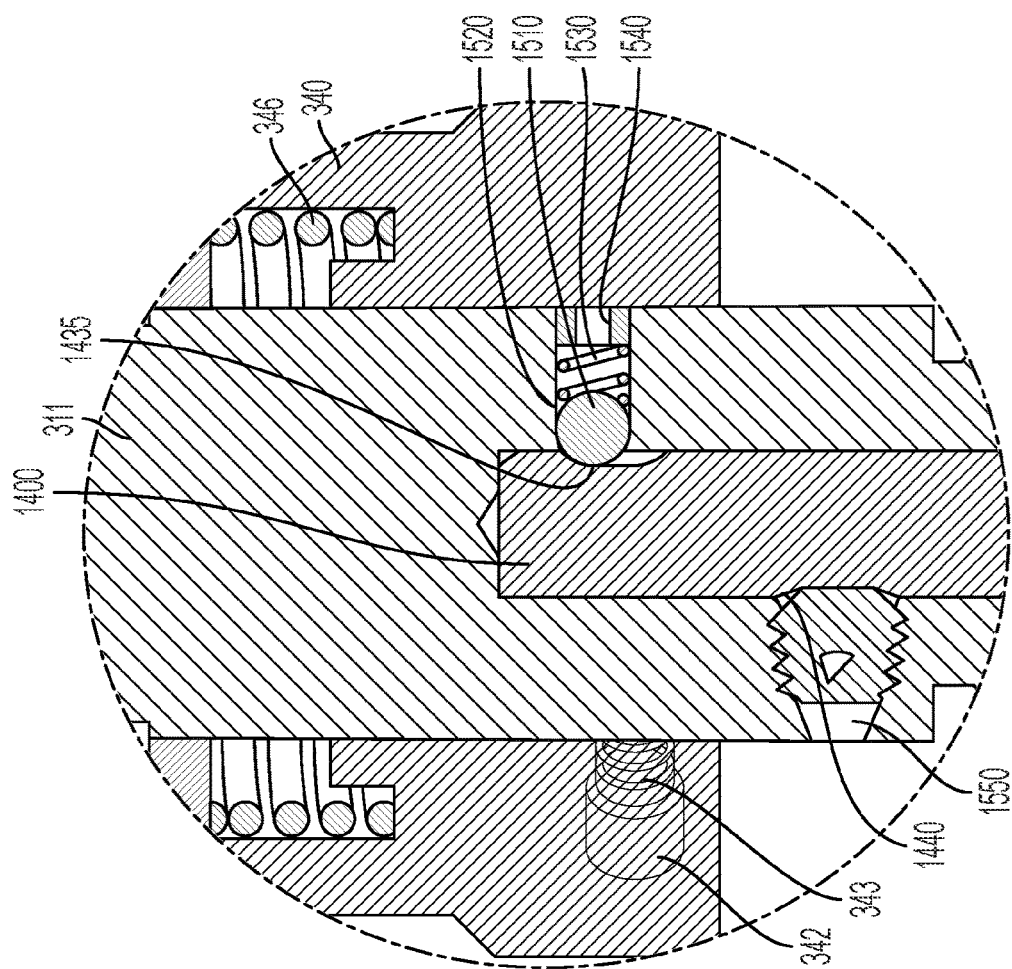
FIG. 15C(2)
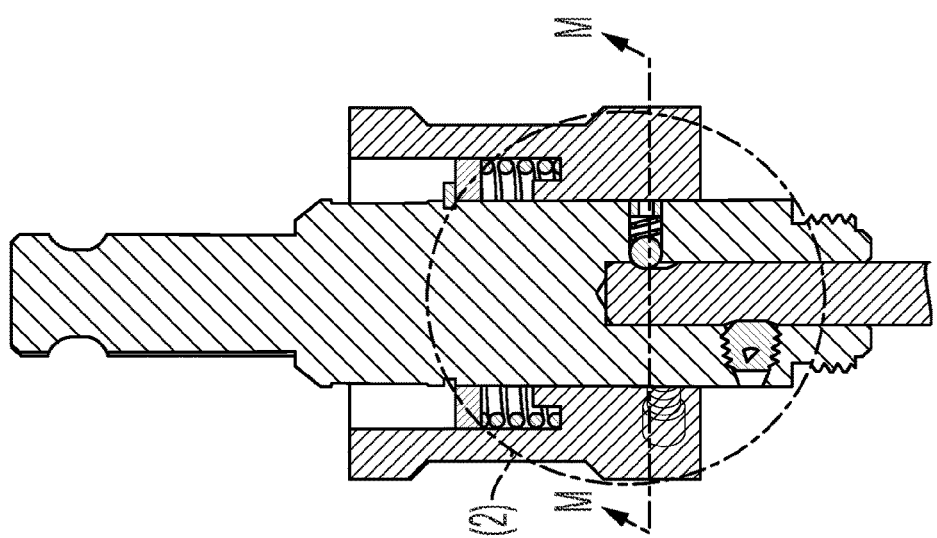
FIG. 15C(1)

HOLE CUTTING ACCESSORY FOR POWER TOOL

CROSS REFERENCE TO RELATED APPLICATIONS

This application claims priority to U.S. Provisional Application No. 63/263,113, filed on Oct. 27, 2021, and to U.S. Provisional Application No. 63/200,652, filed on Mar. 19, 2021, the entireties of which are incorporated herein by reference.

FIELD

This document relates, generally, to a hole cutting accessory for a power-driven tool, and in particular to a hole cutting accessory that facilitates quick release and quick attachment of a pilot drill bit, and quick release and quick attachment of a hole saw accessory

BACKGROUND

Power-driven tools typically include a motor that outputs a force to drive an accessory and perform an operation on a workpiece. One such accessory may be a hole saw that allows a hole to be cut in the workpiece without destruction of the core material. The hole saw can include an arbor that couples an annular saw blade to an output mechanism of the power-driven tool. A pilot drill bit can be coupled in the arbor to guide the operation of the annular saw blade. Removal and/or replacement of the pilot drill bit from the arbor, and removal and/or replacement of the annular saw blade from the arbor, separately from the removal/replacement of the pilot drill bit, may enhance utility and functionality of the power-driven tool.

SUMMARY

In one general aspect, a hole cutting accessory for a power-driven tool may include an arbor that provides for quick release of an annular saw blade component of the accessory, and for quick release of a pilot drill bit component of the accessory. The quick release of the annular saw blade component from the arbor may be accomplished separately from the quick release of the pilot drill bit component from the arbor, and without the use of an external tool.

In another general aspect, a quick change hole cutting accessory may include an arbor that is moveable without use of an external tool among a first configuration, a second configuration, and a third configuration; an annular hole saw configured to be releasably coupled to the arbor; and a pilot drill bit configured to be releasably coupled to the arbor. In the first configuration of the arbor, both the hole saw and the pilot drill bit may be fixedly coupled to the arbor. In the second configuration of the arbor, one of the hole saw or the pilot drill bit may be releasable from the arbor while the other of the hole saw or the pilot bit remains fixedly coupled to the arbor. In the third configuration of the arbor, the other of the hole saw or the pilot drill bit may be releasable from the arbor.

In some implementations, the arbor may include a shaft portion extending along an axis; a sleeve movably coupled to the shaft portion; a plurality of recesses defined in one of the shaft portion or the sleeve; and a detent coupled to the other of the shaft portion or the sleeve and configured to selectively engage the plurality of recesses upon movement of the sleeve relative to the shaft portion. In a first position of the sleeve relative to the shaft portion corresponding to the first configuration of the arbor, the detent engages a first recess of the plurality of recesses. In in a second position of the sleeve relative to the shaft portion corresponding to the second configuration of the arbor, the detent engages a second recess of the plurality of recesses. In a third position of the sleeve relative to the shaft portion corresponding to the third configuration of the arbor, the detent engages a third recess of the plurality of recesses.

In some implementations, the detent may be movable from an engaged position with the first recess to an engaged position with the second recess in response to a first axial movement of the sleeve from the first position to the second position along the shaft portion of the arbor. In some implementations, the detent may be moveable from the engaged position with the second recess to an engaged position with the third recess in response to a second axial movement of the sleeve from the second position to the third position on the shaft portion of the arbor. In some implementations, the first recess, the second recess, and the third recess are spaced axially along a line parallel to the axis. In some implementations, the detent is moveable from the engaged position with the second recess to an engaged position with the third recess in response to a second rotational movement of the sleeve from the second position to the third position about the shaft portion of the arbor. In some implementations, the first recess and the second recess are spaced axially along a line parallel to the axis and the second recess and the third recess are spaced circumferentially about the axis.

In some implementations, the arbor may include a shaft portion extending along an axis with an axial bore defined configured to receive the pilot drill bit; and a sleeve received over the shaft portion and moveable among a first position relative to the shaft corresponding to the first configuration, a second position relative to the shaft corresponding to the second configuration, and a third position relative to the shaft corresponding to the third configuration. In some implementations, the shaft may include a threaded front end portion configured to be received in a threaded opening in the hole saw. In the first position of the sleeve on the shaft portion of the arbor, the threaded front end portion is received in the threaded opening in the hole saw so as to rotationally drive the hole saw upon rotation of the arbor. In at least one of the second position or the third position of the sleeve relative the arbor, the at least one hole saw may be unthreaded from the front end portion to remove the hole saw from the arbor.

In some implementations, the sleeve may include at least one drive projection extending axially from the sleeve, wherein the at least one drive projection is configured to be selectively received in a corresponding opening in the hole saw. In the first position of the sleeve on the shaft portion of the arbor, the at least one drive projection is received in the corresponding opening in the hole saw so as to rotationally drive the hole saw upon rotation of the arbor. In at least one of the second position or the third position of the sleeve relative the arbor, the at least one drive projection is released from the corresponding opening in the hole saw. In some implementations, a retention passage may be radially formed in the shaft portion and in communication with the bore; and a retention member positioned in the retention passage and configured to selectively engage the pilot drill bit to retain the pilot drill bit in the bore. In some implementations, in the first position of the sleeve on the shaft portion of the arbor, the retention member is engaged with the pilot drill bit so as to retain the pilot drill bit in the bore of the arbor; and in at least one of the second or third position of the sleeve on the shaft portion of the arbor, the retention member is moveable radially outward in the retention passage and disengagable from the pilot drill bit such that the pilot drill bit is releasable from the arbor. In some implementations, the pilot drill bit includes at least one retention recess releasably engagable by the retention member to retain the drill bit in the axial bore when the sleeve is in at least two of the first position, the second position, and the third position. In some implementations, the pilot drill bit includes a non-circular shank portion configured to be engaged by a non-circular portion of the axial bore to transmit rotational torque from the shaft to the pilot drill bit. In some implementations, the non-circular shank portion comprises a flat and the non-circular portion of the axial bore includes a set screw configured to engage the flat.

In some implementations, a threaded coupler may be threadably coupled to an outer circumferential portion of the shaft portion of the arbor. In a first position of the threaded coupler retains the first position of the sleeve on the shaft portion of the arbor. Rotation of the threaded coupler in a first rotational direction relative to the shaft portion of the arbor moves the threaded coupler axially along the shaft portion of the arbor, in a direction away from the sleeve, such that the sleeve is axially movable from the first position to the second position and the third position relative to the shaft portion of the arbor.

In another general aspect, an arbor for a quick change hole cutting accessory may include a shaft including a first coupling portion configured to have a hole saw releasably coupled thereto and a second coupling portion configured to have a pilot drill bit releasably coupled thereto; and a sleeve movably coupled to the shaft. In a first position of the sleeve relative to the shaft, both the hole saw and the pilot drill bit may be configured to be fixedly coupled to the arbor. In a second position of the sleeve on the shaft, one of the hole saw or the pilot drill bit may be configured to be releasable from the arbor without use of an external tool. In a third position of the sleeve on the shaft, the other of the hole saw and the pilot drill bit may be configured to be releasable from the arbor without use of an external tool.

In some implementations, a plurality of recesses may be defined in one of the shaft portion or the sleeve; and a detent coupled to the other of the shaft portion or the sleeve and configured to selectively engage the plurality of recesses upon movement of the sleeve relative to the shaft portion. In the first position of the sleeve, the detent engages a first recess of the plurality of recesses. In the second position of the sleeve, the detent engages a second recess of the plurality of recesses. In the third position of the sleeve, the detent engages a third recess of the plurality of recesses.

In another general aspect, a pilot drill bit for use with a hole saw accessory may include a shank portion configured to be alternately received in a first bore of a first arbor or a second bore in a second arbor, each of the first arbor and the second arbor configured to be releasably coupled to a hole saw. The shank portion may include a non-circular portion with a flat surface configured to be engaged by a set screw in the first arbor to releasably retain the pilot drill bit in the first bore of the first arbor; a recess configured to be engaged by a retention member in the second arbor to releasably retain the pilot drill bit in the second bore of the second arbor; and a fluted cutting portion extending from the shank portion.

In some implementations, the flat surface may also be configured to be engaged by a non-circular surface in the second bore of the second arbor to transmit rotational torque from the second arbor to the drill bit.

The details of one or more implementations are set forth in the accompanying drawings and the description below. Other features will be apparent from the description and drawings, and from the claims.

BRIEF DESCRIPTION OF THE DRAWINGS

FIGS. 4A(1)-4C(2) are cross-sectional views of the example accessory device shown in FIG. 3A, in first, second and third configurations of the example accessory device.

FIGS. 7A(1)-7C(2) illustrate the example accessory device shown in FIGS. 6A-6C in first, second and third configurations of the example accessory device.

FIGS. 10A and 10B are perspective views of an example pilot drill bit for use with a quick release hole saw accessory device, in accordance with implementations described herein.

FIG. 10C is a cross-sectional view of an installation of the example pilot drill bit shown in FIGS. 10A and 10B in an example quick release hole saw accessory device, in accordance with implementations described herein.

FIGS. 11A and 11B are perspective views of an example pilot drill bit for use with a quick release hole saw accessory device, in accordance with implementations described herein.

FIG. 11C is a cross-sectional view of an installation of the example pilot drill bit shown in FIGS. 11A and 11B in an example quick release hole saw accessory device, in accordance with implementations described herein.

FIGS. 12A and 12B are perspective views of an example pilot drill bit for use with a quick release hole saw accessory device, in accordance with implementations described herein.

FIG. 12C is a cross-sectional view of an installation of the example pilot drill bit shown in FIGS. 12A and 12B in an example quick release hole saw accessory device, in accordance with implementations described herein.

FIGS. 15A-15D are cross-sectional views of an installation of the example pilot drill bit shown in FIGS. 14A and 14B in an example quick release hole saw accessory device, in accordance with implementations described herein.

FIG. 15D is a cross-sectional view taken along line M-M of FIG. 15C.

DETAILED DESCRIPTION

A quick change arbor for a hole cutting accessory for use with a power tool (such as a drill, a drill/driver, or an impact driver) is provided. The quick change arbor, in accordance with implementations described herein, allows for quick change of components of the hole cutting accessory, including quick release of components from the arbor and quick connection of components to the arbor. The quick change arbor, in accordance with implementations described herein, provides for the quick change, including quick release and quick connection, of a saw blade component of the hole cutting accessory. The quick change arbor, in accordance with implementations described herein, provides for the quick change, including quick release and quick connection, of a pilot drill bit component of the hole cutting accessory. The quick change arbor, in accordance with implementations described herein, provides for the quick change, including removal and/or replacement of the saw blade component independently of removal and/or replacement of the pilot drill bit component. The quick change arbor, in accordance with implementations described herein, is operable in a first mode in which the arbor is in a first position and the hole cutting accessory is in a locked, or operational position; in a second mode in which the arbor is in a second position and quick change (removal and/or replacement) of one of the saw blade component or the drill bit component can be independently removed and/or replaced; and a third mode in which the arbor is in a third position and the other of the saw blade component or the drill bit component can be independently removed and/or replaced.

Figure 1:
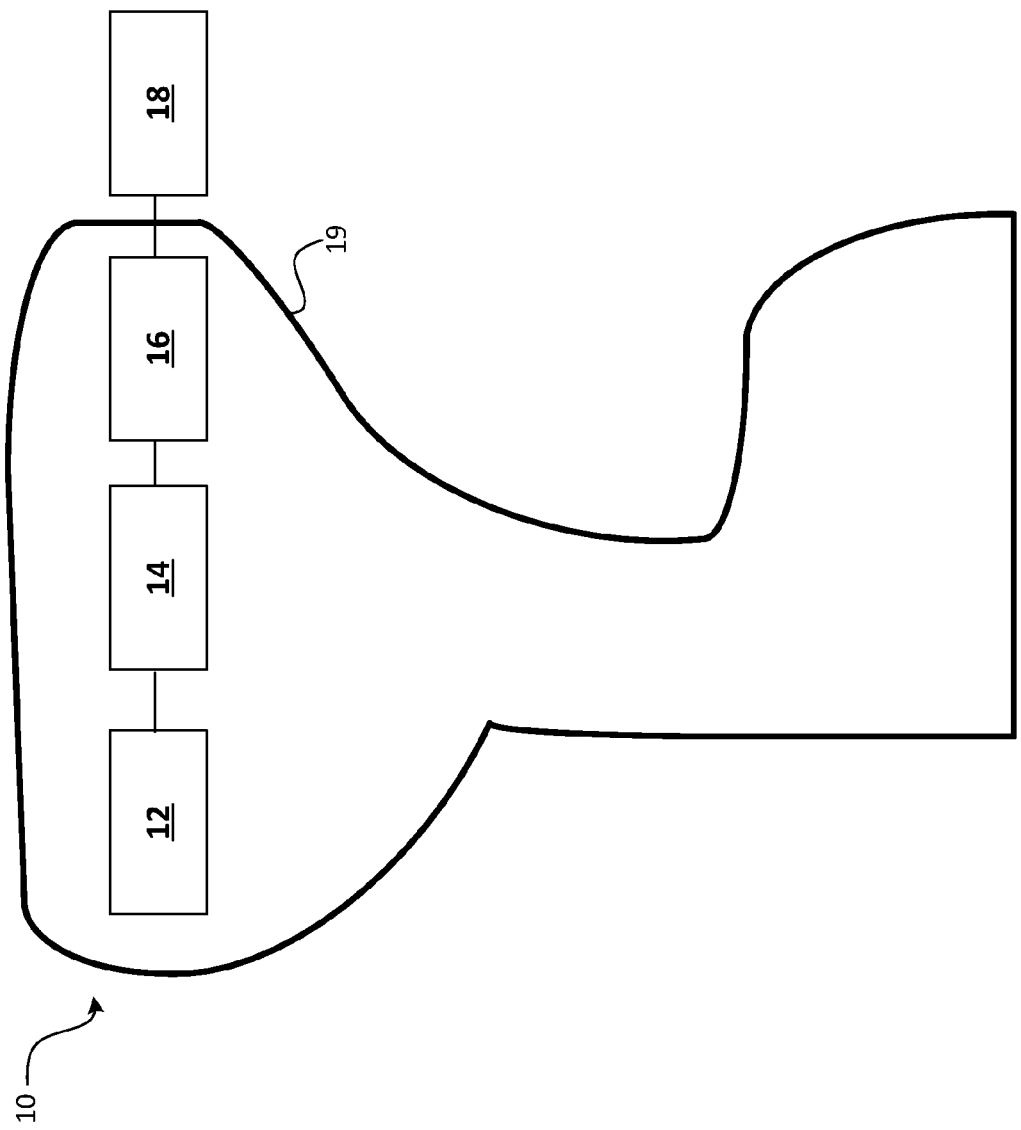
FIG. 1 is a schematic illustration of an example power-driven tool.

A schematic view of an example power-driven tool 10 is shown in FIG. 1. The example tool 10 may include a driving mechanism 12 generating a driving force. A transmission mechanism 14 may be coupled to the driving mechanism 12, to transfer force from the driving mechanism 12 to an output mechanism 16. The output mechanism 16 may output the driving force to an accessory device 18 coupled to the output mechanism 16. The accessory device 18 may selectively impart the force (received from the transmission mechanism 14) on the workpiece. The driving mechanism 12, the transmission mechanism 14, the output mechanism 16 and the accessory device 18 may be received in and/or coupled to a housing 19 of the power-driven tool 10. In some implementations, the driving mechanism 12 may be an electric motor that receives power from, for example, a power storage device (such as, for example, a battery), an external electrical power source, and the like. In some implementations, the driving mechanism 12 may be an air driven, or pneumatic motor, that is powered by compressed air introduced into the housing 19 from an external compressed air source. Other types of driving mechanisms, and other sources of power, may provide for power driven operation of the tool 10. A hole saw may be one example of such an accessory device 18, that receives a rotating force from the motor 12 via the transmission mechanism 14 and the output mechanism 16, and imparts the received rotational force on a workpiece, to cut a hole in the workpiece.

Figure 2:
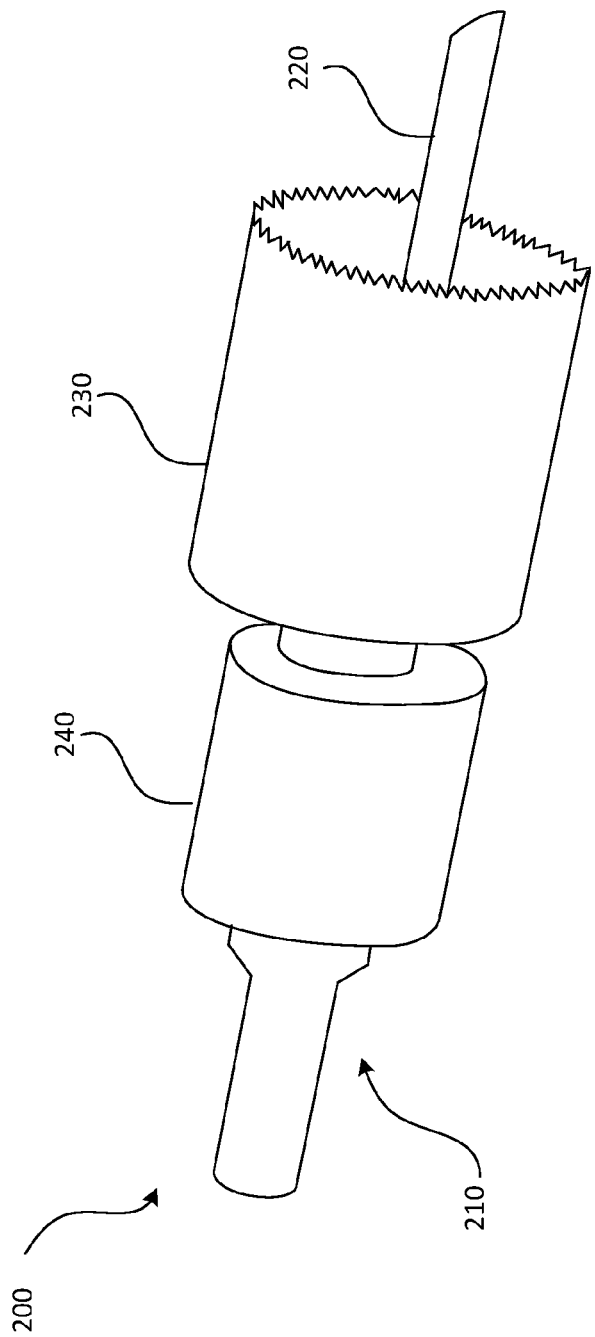
FIG. 2 is a schematic illustration of an example accessory device for a power-driven tool.

FIG. 2 is a schematic view of an example accessory device 200, in the form of an example hole saw accessory 200. The example hole saw 200 shown in FIG. 2 includes an arbor 210 having a first end portion configured to be coupled to an output mechanism of a power-driven tool, as described above with respect to FIG. 1. In the example hole saw 200 shown in FIG. 2, a pilot drill bit 220 is received into a second end portion of the arbor 210, and an annular saw blade 230, or hole saw 230, is coupled to the second end portion of the arbor 210. An engagement device 240, or sleeve 240, is coupled on an outside of the arbor 210. A first movement of the engagement device 240 relative to the arbor 210 may provide for engagement/disengagement between the arbor 210 and the hole saw 230. A second movement of the engagement device 240 relative to the arbor 210 may provide for engagement/disengagement between the arbor 210 and the pilot drill bit 220. For example, the first movement of the engagement device 240 relative to the arbor 210 may provide for the disengagement of a coupling mechanism between the hole saw 230 and the arbor 210, allowing for the release of the hole saw 230 from the arbor 210 for removal and replacement. Similarly, the second movement of the engagement device 240 relative to the arbor 210 may provide for the disengagement of a coupling mechanism between the pilot drill bit 220 and the arbor 210, allowing for the release of the pilot drill bit for removal and replacement, separately from the hole saw 230. In a hole cutting accessory, in accordance with implementations described herein, a single mechanism provides for relatively disengagement and engagement of the pilot drill bit, and relatively rapid disengagement and engagement of the annular saw blade separately from the pilot drill bit, and without the use of additional tools and/or devices, thus enhancing utility and functionality, and improving the operator experience.

Figure 3A:
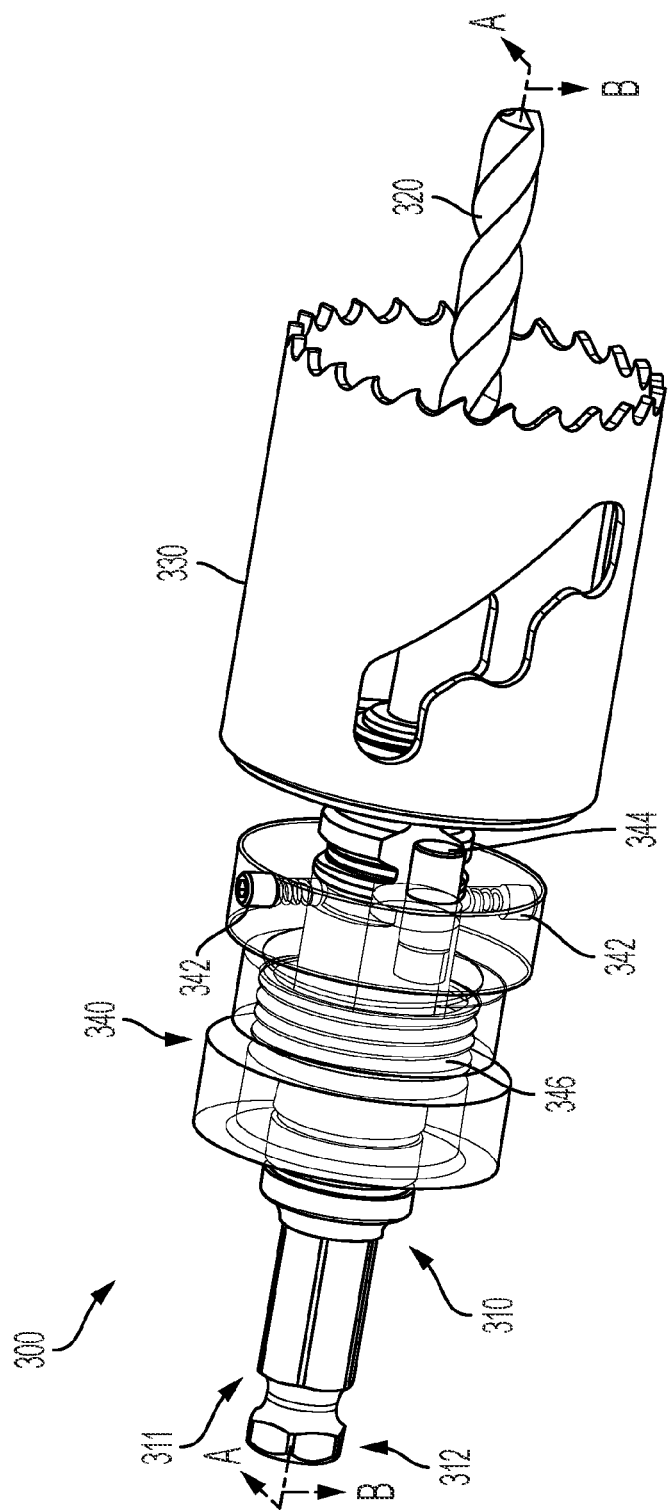
FIG. 3A is a perspective view of an example accessory device, in accordance with implementations described herein.
Figure 3B:
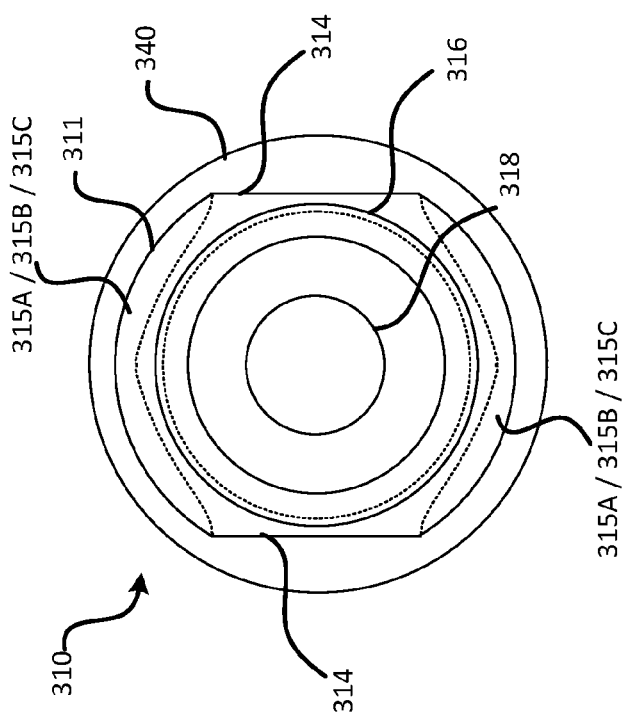
FIG. 3B is an axial end view.
Figure 3C:
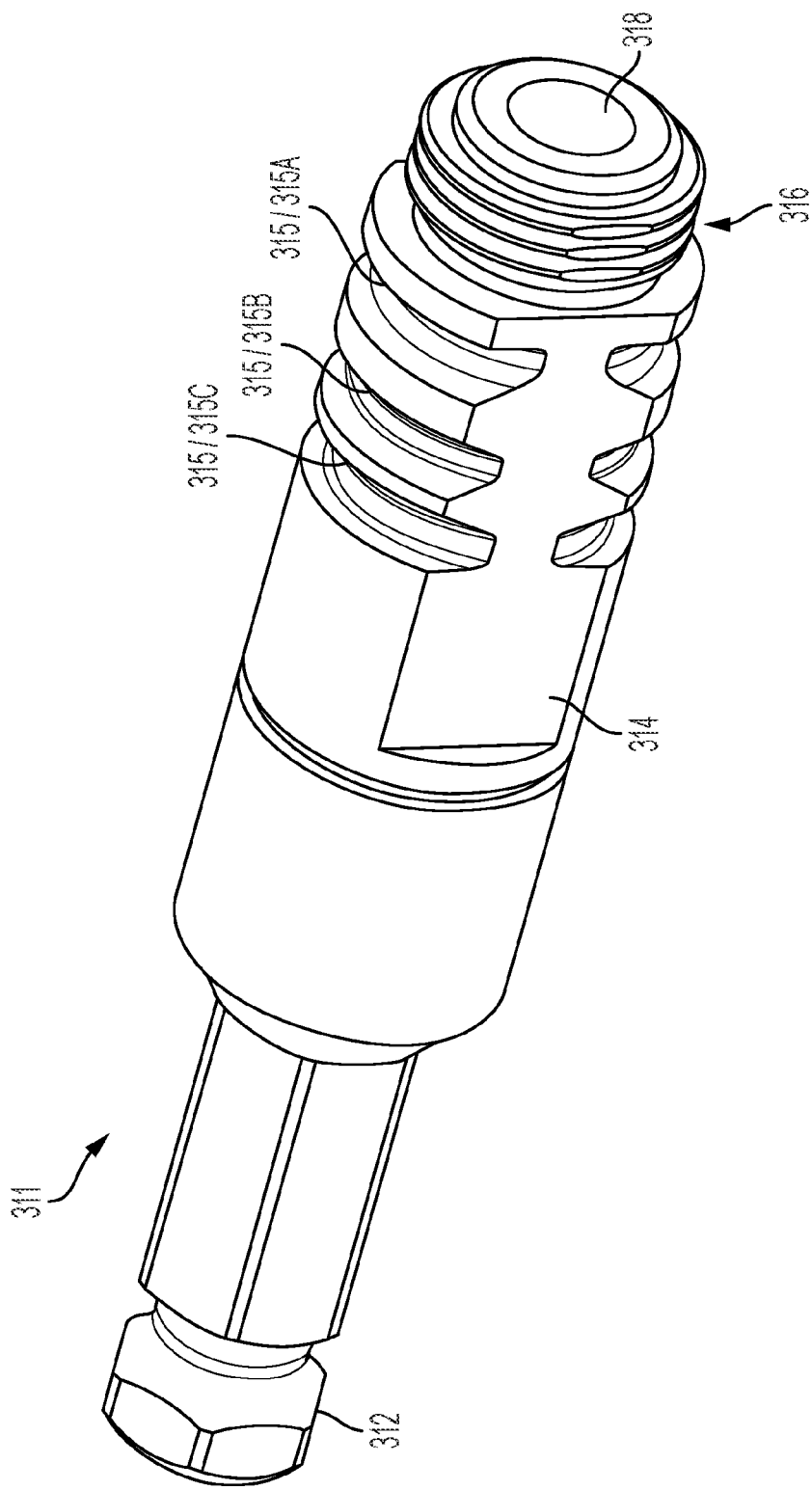
FIG. 3C is a perspective view, of an example arbor portion of the example accessory device shown in FIG. 3A.

FIG. 3A is a perspective view of an example accessory device 300, in the form of an example hole saw accessory 300, in accordance with implementations described herein. FIG. 3B is an axial end view of an arbor 310 of the example accessory device 300 shown in FIG. 3A, in accordance with implementations described herein. FIG. 3C is a perspective view of an example shaft portion 311 of the example arbor 310 of the example hole saw accessory 300 shown in FIG. 3A, in accordance with implementations described herein.

The example hole saw accessory 300 shown in FIGS. 3A-3C includes an arbor 310 having a first coupling portion 312 at a first end of the shaft portion 311, and a second coupling portion 318 and a threaded coupling portion 316 at a second end of the shaft portion 311. The first coupling portion 312 is configured to be coupled to an output mechanism of a power-driven tool, as described above with respect to FIG. 1. The second coupling portion 318, defined by a bore extending axially from an opening at a second end portion of the arbor 310, provides for coupling of a pilot drill bit 320 to the arbor 310. The threaded coupling portion 316 of the arbor 310 provides for coupling of an annular saw blade 330, or hole saw 330, to the arbor 310. An engagement device 340, or sleeve 340, is positioned on an outer facing side of the shaft portion 311 of the arbor 310. The sleeve 340 may be movable relative to the shaft portion 311 of the arbor 310.

In the example hole saw 300 shown in FIGS. 3A-3C, the sleeve 340 is movable relative to the shaft portion 311 of the arbor 310, for example, movable in an axial direction relative to the shaft portion 311 of the arbor 310. One or more retention pins, or detents 342 extend radially through the sleeve 340. The example implementation shown in FIGS. 3A-3C includes two detents 342. The detents 342 are configured to selectively engage one of a plurality of grooves 315, or recesses 315 formed in a corresponding outer circumferential portion of the shaft portion 311 of the arbor 310. In the example shown in FIGS. 3A-3C, the recesses 315 are defined in the outer circumferential portion of the shaft portion 311, with raised areas positioned between adjacent recesses 315. In some implementations, the detents 342 include biasing devices 343, or springs 343. The springs 343 exert a biasing force on a retention device 345, for example, a ball 345, that biases the ball 345 radially inward, forcing the ball 345 into one of the recesses 315, depending on a position of the sleeve 340 relative to the shaft portion 311 of the arbor 310. Engagement of the ball 345 in one of the recesses 315 maintains a selected position of the sleeve 340 on the shaft portion 311 of the arbor 310. In some implementations, one or more flat portions 314 may be defined on the shaft portion 311 of the arbor 310. For example, as shown in FIG. 3B, first and second flat portions 314 formed on opposite outer circumferential portions of the sleeve may be positioned between first and second sets of recesses 315 formed on opposite outer circumferential portions of the shaft portion 311 of the arbor 310. In some implementations, the one or more flat portions 314 may provide for indexing in coupling the hole saw 330 to the arbor 310, and may form an anti-rotation feature restricting rotation of the shaft portion 311 of the arbor 310 within the sleeve 340. In some implementations, a biasing device 346 such as, for example, a spring 346, exerts a biasing force on the sleeve 340 that biases the sleeve 340 towards the hole saw 330.

In some implementations, one or more drive projections 344, or pins 344, extend outward, for example, in an axial direction, from an end portion of the sleeve 340, toward the hole saw 330. The drive projections 344 may be selectively received in corresponding openings 334 formed in the hole saw 330. Insertion of the drive projections 344 into the openings 334 in the hole saw 330 maintain a position of the hole saw 330 relative to the arbor 310 in an operational position of the hole saw 300, and allow a driving force to be transferred to the hole saw 330 for operation on a workpiece. In some implementations, the insertion of the drive projections 344 into the openings 334 maintains a rotational position of the hole saw 330 that has been threadably coupled on to the threaded coupling portion 316 of the arbor 310. This allows for the transfer of driving force to the hole saw 330. This may restrict further rotation of the hole saw 330 on the threaded coupling portion 316 of the arbor 310 during operation of the hole saw 300 coupled to the power-driven tool. Without restricting further rotation of the hole saw 330 relative to the arbor 310 in this manner, further rotation of the hole saw 330 on the threaded coupling portion 316 of the arbor 310 during operation can cause the hole saw 330 to be seized on the threaded coupling portion 316, making the hole saw 330 difficult to remove from the arbor 310 without additional tooling.

FIGS. 4A(1) and 4A(2) are a cross-sectional views of the example hole saw 300 shown in FIGS. 3A-3C with the sleeve 340 in a first position relative to the shaft portion 311 of the arbor 310 corresponding to a first mode of the arbor 310. FIG. 4A(1) is a cross-sectional view taken along line A-A in FIG. 3A, and FIG. 4A(2) is a cross-sectional view taken along line B-B of FIG. 3A.

In the first position of the sleeve 340 relative to the shaft portion 311 of the arbor 310, both the pilot drill bit 320 and the hole saw 330 are fixed to, or retained by the arbor 310. In particular, as shown in FIG. 4A(1), in the first position, the ball 345 of each of the detents 342 is received in a respective first recess 315A. The ball 345 of each of the detents 342 is biased, or urged into the respective first recess 315A in response to the biasing force exerted on each ball 345 by the respective spring 343. The retention of the detents 342 in the first recess 315A maintains the first position of the sleeve 340 relative to the shaft portion 311 of the arbor 310.

In this first position, the sleeve 340 is axially positioned adjacent to the hole saw 330, and each of the drive projections 344 is received in the respective opening 334 in the hole saw 330, as shown in FIG. 4A(2). This arrangement precludes the unthreading and decoupling of the hole saw 330 from the arbor, thus fixing the coupling of the hole saw 330 to the arbor 310. In the first position, the pilot drill bit 320 is fixed or retained in the recess defining the second coupling portion 318 by a retention member 349, such as for example a ball, received in a retention passage 348 defined in an axial wall of the shaft portion 311 of the arbor 310. The retention member 349 engages a retention recess 329 formed in a corresponding end portion of the pilot drill bit 320 to restrict axial movement of the pilot drill bit 320 relative to the arbor 310, thus locking the pilot drill bit 320 in the arbor 310 and preventing release of the pilot drill bit 320 from the arbor 310. In the first position, the retention member 349 is retained in an engaged position in the retention recess 329, and is prevented from moving radially outward by a position of an inner peripheral surface of the sleeve 340 against the retention member 349. When the hole saw 300 is coupled to a power-driven tool, the hole saw 300 having both the pilot drill bit 320 and the hole saw 330 fixed to the arbor 310 by the positioning of the sleeve 340 in the first position as described above may be in an operational state, or a locked state, allowing the hole saw 300 to perform an operation on a workpiece in response to a driving force generated by the power-driven tool.

FIGS. 4B(1) and 4B(2) are a cross-sectional views of the example hole saw 300 shown in FIGS. 3A-3C with the sleeve 340 in a second position relative to the shaft portion 311 of the arbor 310, corresponding to a second mode of the arbor 310. FIG. 4B(1) is taken along line A-A in FIG. 3A, and FIG. 4B(2) is taken along line B-B of FIG. 3A.

An external pulling or sliding motion may be exerted on the sleeve 340 to move the sleeve 340 axially relative to the shaft portion 311 of the arbor 310, from the first position shown in FIGS. 4A(1) and 4A(2) to the second position shown in FIGS. 4B(1) and 4B(2). In the second position of the sleeve 340 relative to the shaft portion 311 of the arbor 310, the ball 345 of each of the detents 342 is now biased, or urged into the second recess 315B in response to the biasing force exerted on each ball 345 by the respective spring 343. The retention of the detents 342 in the second recess 315B maintains the second position of the sleeve 340 relative to the shaft portion 311 of the arbor 310. In this second position, the sleeve 340 has been moved axially away from the hole saw 330, and each of the drive projections 344 has been removed out of the respective opening 334 in the hole saw 330, as shown in FIG. 4B(2). This movement of the sleeve 340 away from the hole saw 330 and removal of the drive projections 344 from the openings 334 releases the hole saw 330 from the sleeve 340, and allows the hole saw 330 to be decoupled from the threaded coupling portion 316 of the arbor 310, thus allowing for removal of the hole saw 330 from the arbor 310 and/or replacement, for example, with a different annular saw blade for a different size cut and the like. In the second position, the pilot drill bit 320 remains fixed in the recess defining the second coupling portion 318 by the engagement of the retention member 349 in the retention recess 329 formed in the end portion of the pilot drill bit 320. In the second position, the retention member 349 remains retained in the retention recess 329, and is prevented by moving radially outward by the inner peripheral surface of the sleeve 340. Thus, in the second position, the hole saw 330 can be removed and/or replaced independently from the pilot drill bit 320, without also necessarily involving disengagement of the pilot drill bit 320.

FIGS. 4C(1) and 4C(2) are cross-sectional views of the example hole saw 300 shown in FIGS. 3A and 3B with the sleeve 340 in a third position relative to the shaft portion 311 of the arbor 310, corresponding to a third mode of the arbor 310. FIG. 4C(1) is taken along line A-A in FIG. 3A, and FIG. 4C(2) is taken along line B-B of FIG. 3A.

An external pulling or sliding force or motion may be exerted on the sleeve 340 to move the sleeve 340 axially relative to the shaft portion 311 of the arbor 310, from the second position shown in FIGS. 4B(1) and 4B(2) to the third position shown in FIGS. 4C(1) and 4C(2). Additionally, an external pulling or sliding motion may be exerted on the sleeve 340 to move the sleeve 340 axially, from the first position, through the second position and into the third position. In the third position of the sleeve 340 relative to the shaft portion 311 of the arbor 310, the ball 345 of each of the detents 342 is now biased, or urged into the third recess 315C in response to the biasing force exerted on each ball 345 by the respective spring 343. The retention of the detents 342 in the third recess 315C maintains the third position of the sleeve 340 relative to the shaft portion 311 of the arbor 310. In this third position, the sleeve 340 has been moved axially further from the hole saw 330, and each of the drive projections 344 remains removed from the respective opening 334 in the hole saw 330, as shown in FIG. 4C(2). The hole saw 330 can also be decoupled from the threaded coupling portion 316 of the arbor 310 when the sleeve 340 is in the third position relative to the arbor 310. In the third position, a cutaway portion 341 of the sleeve 340 has been brought into position with the retention passage 348, allowing the retention member 349 to move radially in the retention passage 348 and out of the retention recess 329 formed in the end portion of the pilot drill bit 320. This movement of the retention member releases the pilot drill bit 320 from the arbor 310 and allows for removal and replacement of the pilot drill bit 320. Thus, in the third position of the sleeve 340 relative to the shaft portion 311 of the arbor 310, the pilot drill bit 320 can be removed and/or replaced independently from the hole saw 330, without also necessarily involving disengagement of the hole saw 330.

The ability to quickly release the pilot drill bit 320, and to quickly release the hole saw 330, independently from each other, and without the use of additional tools and/or mechanisms, enhances utility and functionality of the hole saw 300, and improves the operator experience with the use of the hole saw 300.

Figure 5A:
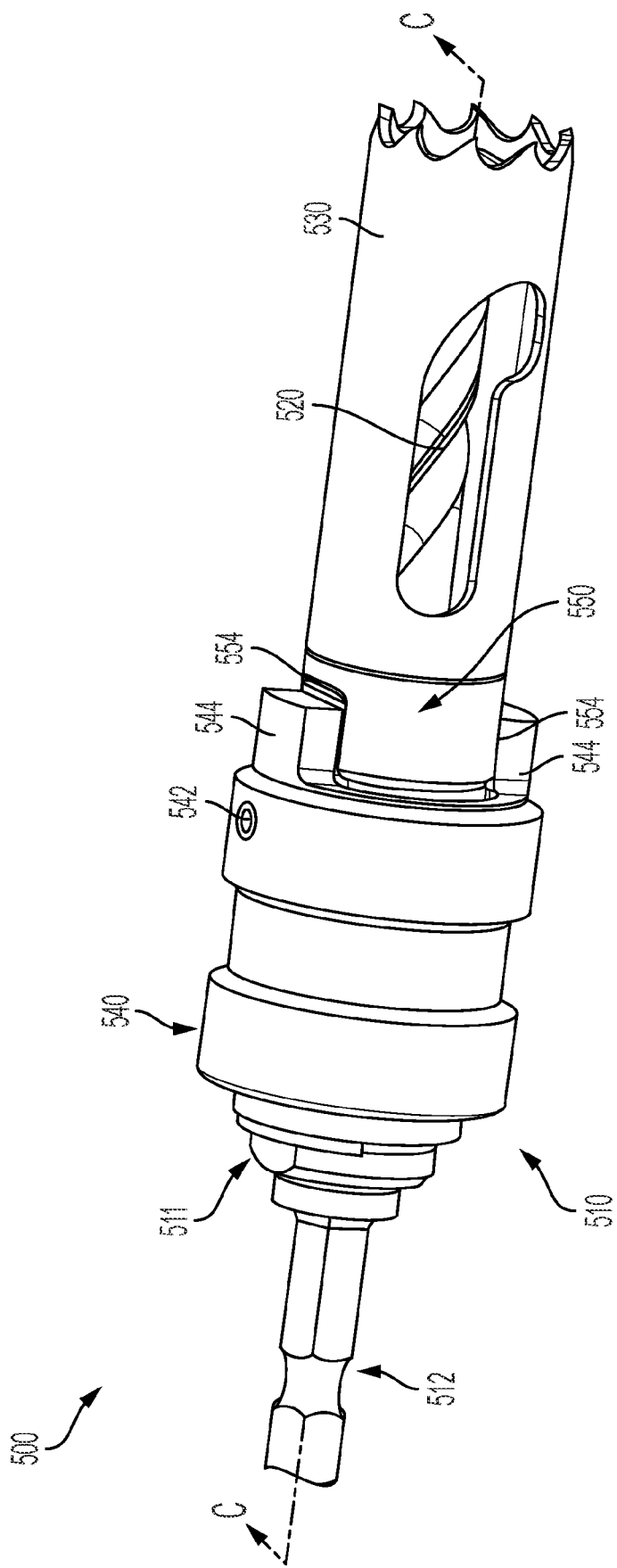
FIG. 5A is a perspective view of an example accessory device, in accordance with implementations described herein.
Figure 5B:
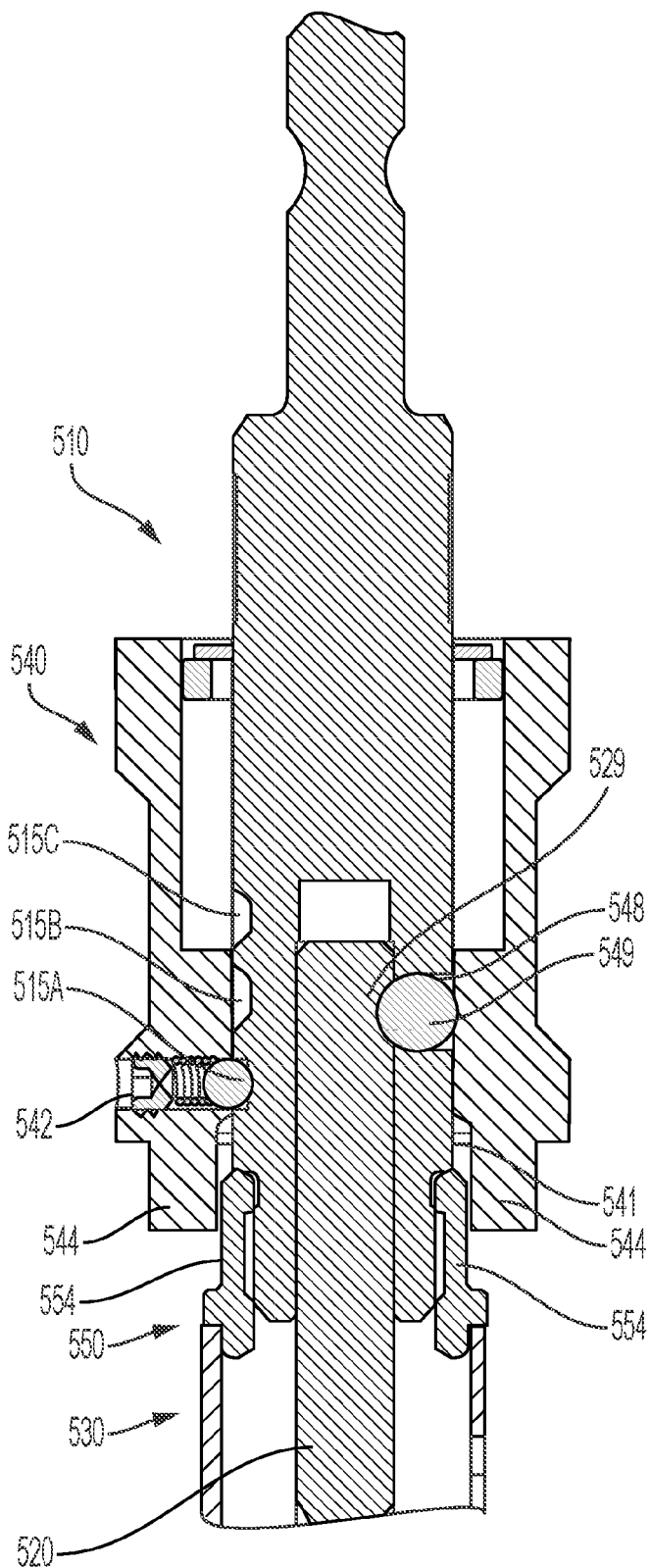
FIGS. 5B-5D are cross-sectional views of the example accessory device shown in FIG. 5A.
Figure 5C:
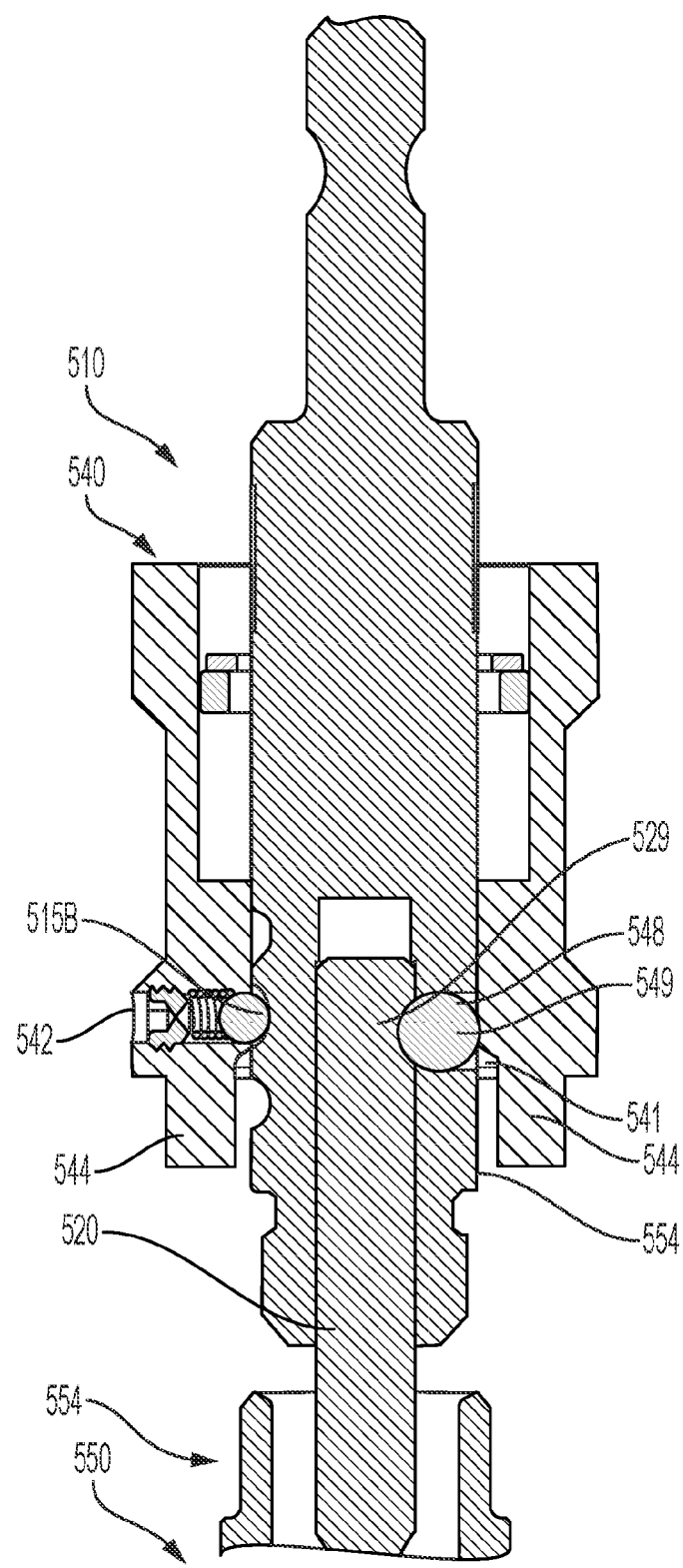
Figure 5D:
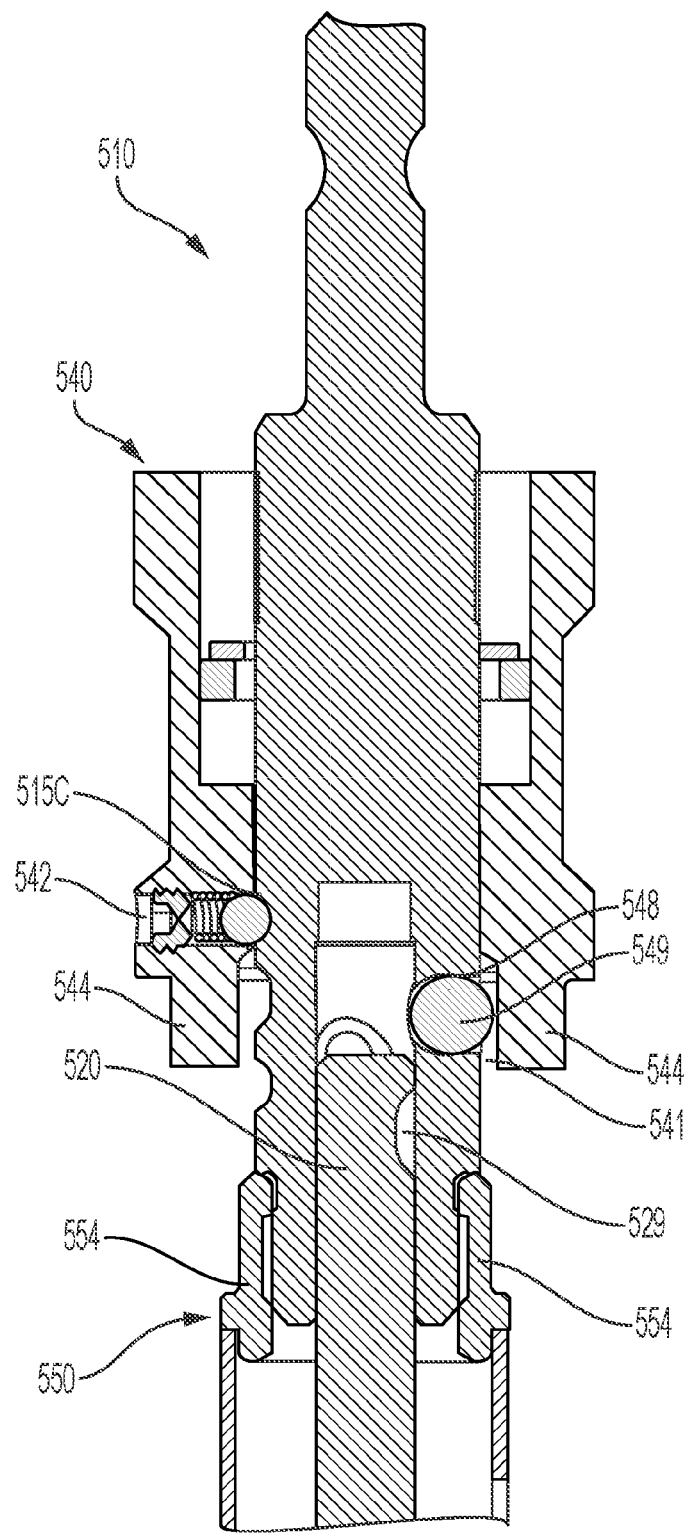

FIG. 5A is a perspective view of an example accessory device 500, in the form of an example hole saw accessory 500, in accordance with implementations described herein. FIGS. 5B, 5C and 5D are cross-sectional views of the example hole saw accessory 500 shown in FIG. 5A, taken along line C-C of FIG. 5A.

The example hole saw accessory 500 shown in FIG. 5A is similar to the example hole saw accessory 300 described above with respect to FIGS. 3A-4C, but adapted to accommodate an annular saw blade having a relatively smaller diameter. The example hole saw accessory 500 shown in FIG. 5A includes an arbor 510 that provides for the coupling of an annular saw blade 530, or hole saw 530, to an output mechanism of a power-driven tool. A sleeve 540 is movably positioned on an outer facing side of a shaft portion 511 of the arbor 510. One or more detents 542 extend radially through the sleeve 540 to engage one or more recesses 515 defined on the shaft portion 511 of the arbor 510 to retain a position of the sleeve 540 relative to the shaft portion 511 of the arbor 510. Interaction of the elements of the one or more detents 542 and the recesses 515 is similar to that which was described above with respect to the one or more detents 342 and recesses 315 of the example hole saw accessory 300 shown in FIGS. 3A-4C, and thus repetitive detailed description will be omitted. In the example implementation shown in FIG. 5A, an adapter 550 is coupled to an end portion of the annular saw blade 530, with the adapter 550 positioned between the sleeve 540 and the hole saw 530. In some implementations, the sleeve 540 may include one or more drive projections 544 extending axially from the sleeve 540 toward the adapter 550, so that the one or more drive projections 544 can be selectively received in/retained in a corresponding one or more slots 554 in the adapter 550. For example, in the operational state, or the locked state, of the example hole saw 500, the drive projections 544 are received in/engaged in the respective slots 554 of the adapter 550 to couple and maintain a position of the sleeve 540, the adapter 550 and the hole saw 530.

FIG. 5B is a cross-sectional view of a first position of the sleeve 540 relative to the shaft portion 511 of the arbor 510 shown in FIG. 5A, corresponding to a first mode of the arbor 510. In this first position of the sleeve 540/first mode of the arbor 510, both the pilot drill bit 520 and the annular saw blade 530 are fixed to, or retained by the arbor 510. The first position shown in FIG. 5B may be considered a locked position, or an operational position, in which the pilot drill bit 520 and the hole saw 530 are in retained positions and can transmit a driving force for performing an operation on a workpiece. In the first position shown in FIG. 5B, a biasing device such as, for example, a spring (not shown in FIG. 5B) exerts a biasing force on the sleeve 540 that biases the sleeve 540 toward the adapter 540/hole saw 530. In the first position shown in FIG. 5B, the ball of the detent 542 is biased or urged into the first recess 515A to maintain the first position of the sleeve 540 relative to the shaft portion 511 of the arbor 510. In this first position, the sleeve 540 is axially positioned adjacent to the adapter 550, which is in turn coupled to and adjacent to the hole saw 530, with each of the drive projections 544 received in/retained by a corresponding slot 554 formed in the adapter 550. This arrangement fixes the coupling of the hole saw 530 and the arbor 510, and restricts further rotation of the hole saw 530 with respect to the arbor 510. Similar to what was described above with respect to FIGS. 3A-4C, in the first position the pilot drill bit 520 is fixed in the arbor 510 by the retention member 549 positioned in the retention passage 548 defined in the axial wall of the shaft portion 511 of the arbor 510 and engaged in the retention recess 529 formed in the pilot drill bit 520 to restrict axial movement of the pilot drill bit 520 relative to the arbor 310. When the hole saw 500 is coupled to a power-driven tool, the hole saw 300 having both the pilot drill bit 520 and the saw blade 530 fixed to the arbor 510 by the positioning of the sleeve 540 in the first position may be in a locked, or operational state, allowing the hole saw 500 to perform an operation on a workpiece in response to a driving force generated by the power-driven tool.

FIG. 5C is a cross-sectional view of a second position of the sleeve 540 relative to the shaft portion 511 of the arbor 510 shown in FIG. 5A, corresponding to a second mode of the arbor 510. In the second position, the sleeve 540 has been moved axially away from the adapter 550 and hole saw 530, so that the ball of the detent 542 is now biased, or urged and engaged with the second recess 515B to maintain the second position of the sleeve 540 relative to the shaft portion 511 of the arbor 510. Axial movement of the sleeve 540 away from the adapter 550 and the hole saw 530 removes the drive projections 544 from the respective slots 554 in the adapter 550, allowing the hole saw 530 to be decoupled from the arbor 510, and/or replaced by a different annular saw blade/hole saw and the like. In the second position, the pilot drill bit 520 remains fixed in the arbor 510 by the engagement of the retention member 549 in the retention recess 529 formed in the pilot drill bit 520. Thus, in the second position, the hole saw 530 can be removed and/or replaced independently from the pilot drill bit 520, without also necessarily involving disengagement of the pilot drill bit 520.

FIG. 5D is a cross-sectional view of a third position of the sleeve 540 relative to the shaft portion 511 of the arbor 510 shown in FIG. 5A, corresponding to a third mode of the arbor. In the third position, the sleeve 540 is moved axially further away from the adapter 550 and hole saw 530, so that the ball of the detent 542 is now biased, or urged into the third recess 515C to maintain the third position of the sleeve 540 relative to the shaft portion 511 of the arbor 510. In this third position, the drive projections 544 remain removed from the slots 554 in the adapter 550. In the third position, the annular saw blade 530 can be decoupled from the arbor 510, or remain coupled to the arbor 510. In the third position, a cutaway portion 541 of the sleeve 540 is brought into position with the retention passage 548, allowing the retention member 549 to move radially out of the retention recess 529 and into the retention passage 548. This radial movement of the retention member 549 releases the pilot drill bit 520 from the arbor 510 and allows for removal and/or replacement of the pilot drill bit 520. Thus, in the third position of the sleeve 540 relative to the shaft portion 511 of the arbor 510, the pilot drill bit 520 can be removed and/or replaced independently from the hole saw 530, without also necessarily involving disengagement of the hole saw 530.

The ability to quickly release the pilot drill bit 520, and to quickly release the hole saw 530, independently from each other, and without the use of additional tools and/or mechanisms, enhances utility and functionality of the hole saw 500, and improves the operator experience with the use of the hole saw accessory 500.

Figure 6A:
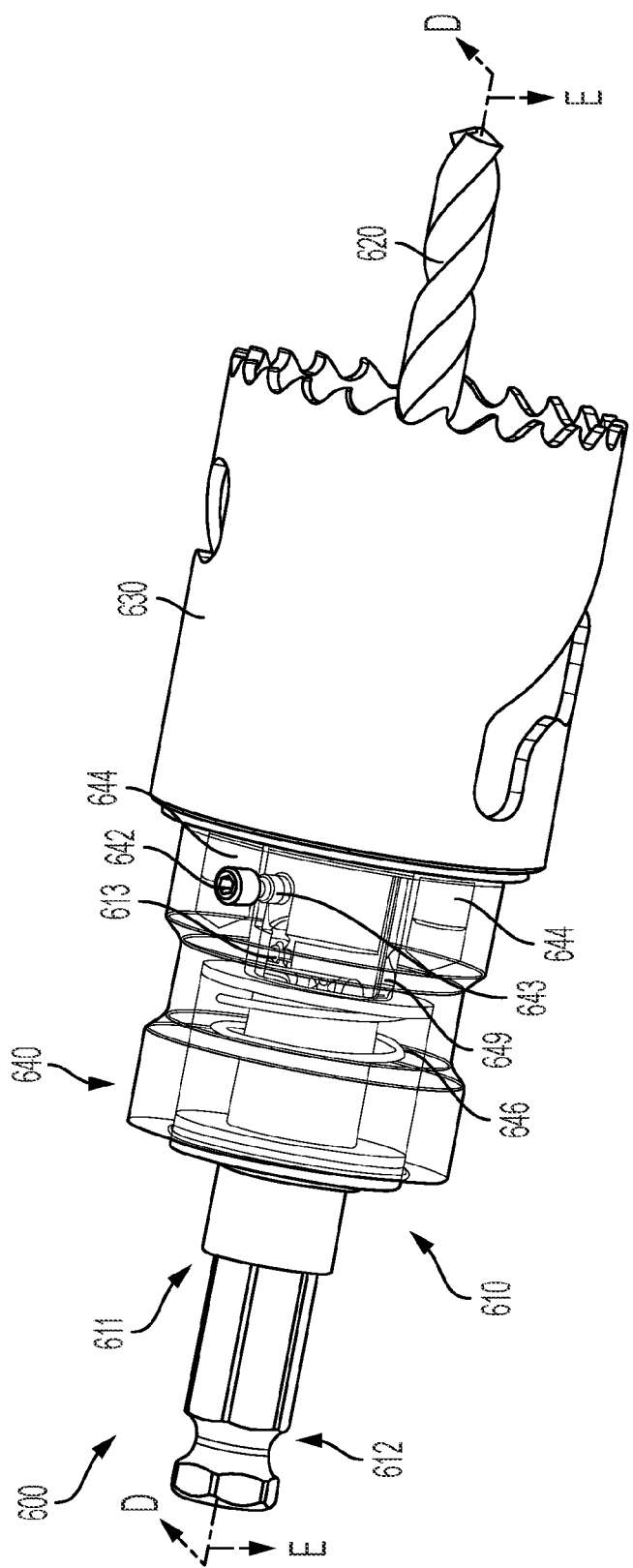
FIG. 6A is a perspective view of an example accessory device, in accordance with implementations described herein.
Figure 6B:
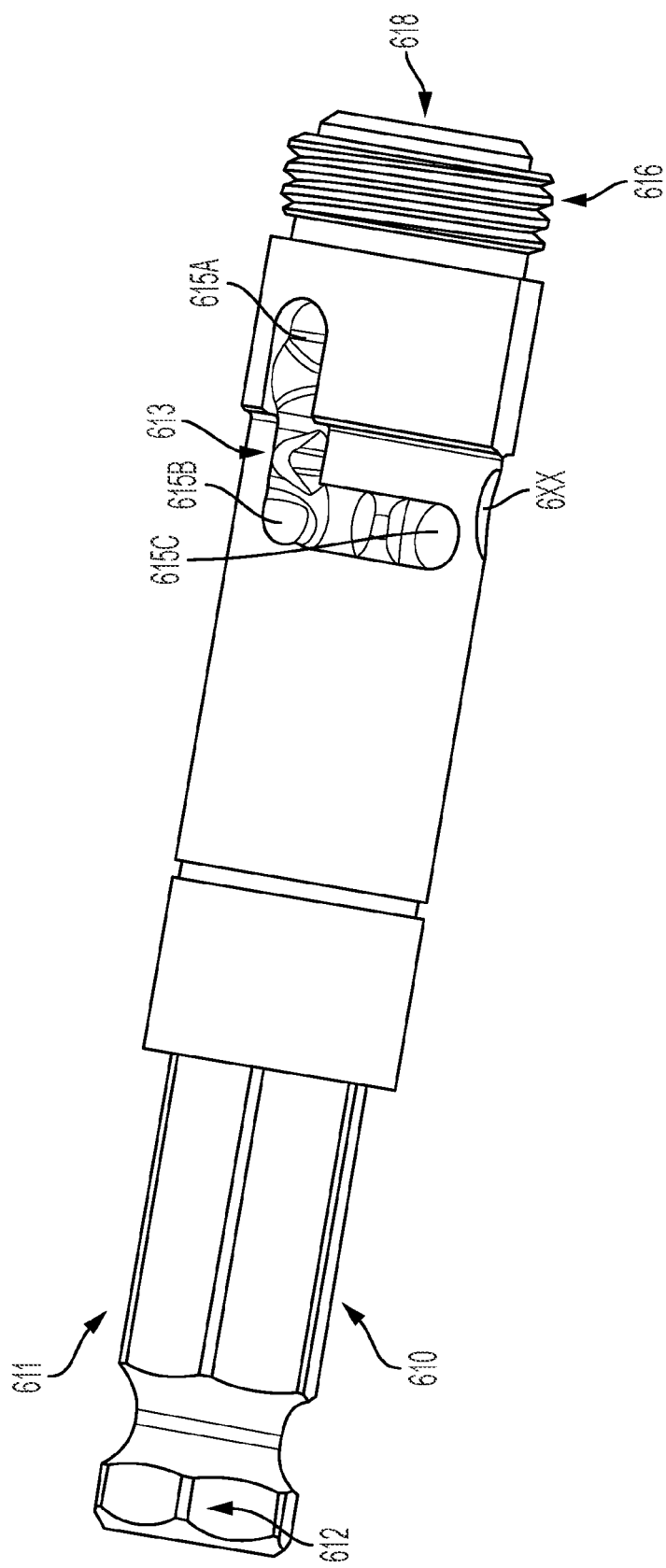
FIGS. 6B and 6C are partial perspective views of an arbor portion of the example accessory device shown in FIG. 6A.
Figure 6C:
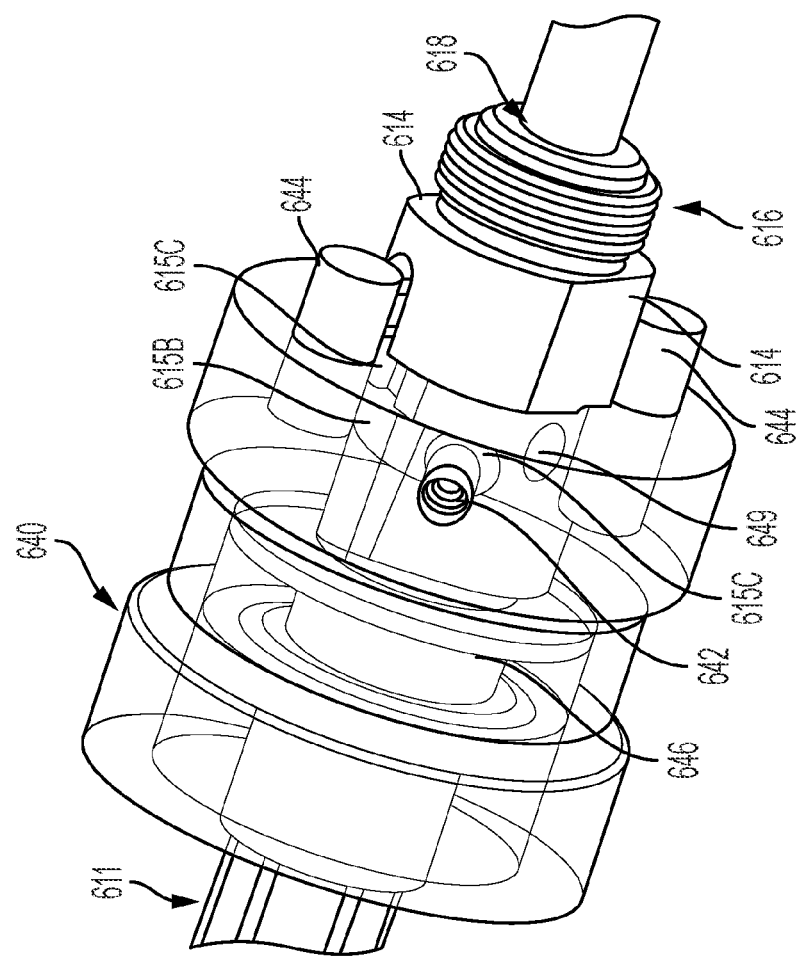

FIG. 6A is a perspective view of an example accessory device 600, in the form of an example hole saw accessory 600, in accordance with implementations described herein. FIG. 6B is a perspective view of an example shaft portion 611 of an example arbor 610 of the example hole saw accessory 600 shown in FIG. 6A, in accordance with implementations described herein. FIG. 6C is a partial perspective view of the example arbor 610 shown in FIG. 6B, in accordance with implementations described herein.

The example hole saw accessory 600 includes an arbor 610 having a first coupling portion 612 at a first end of the shaft portion 611, and a second coupling portion 618 and a threaded coupling portion 616 at a second end of the shaft portion 611. The first coupling portion 612 is configured to be coupled to an output mechanism of a power-driven tool, as described above. The second coupling portion 618, defined by a bore extending axially in the shaft portion 611 of the arbor 610 from an opening at a second end portion of the arbor 610, provides for coupling of a pilot drill bit 620 to the arbor 610. The threaded coupling portion 616 provides for coupling of an annular saw blade 630, or hole saw 630, to the arbor 610. An engagement device 640, or sleeve 640, is positioned on an outer facing side of the shaft portion 611 of the arbor 610. The sleeve 640 is movable relative to the shaft portion 611 of the arbor 610.

In the example hole saw 600 shown in FIGS. 6A-6C, the sleeve 640 may be movable in an axial direction, and also rotatable relative to the shaft portion 611 of the arbor 610. At least one detent 642 may extend radially through the sleeve 640 to engage with a groove 613 defined in an outer circumferential surface of the shaft portion 611 of the arbor 610. In some implementations, the groove 613 may be contoured so as to define multiple recesses 615 within the groove 613. For example, in some implementations, a surface of the groove 613 may be contoured to define a first recess 615A, a second recess 615B and a third recess 615C. In some implementations, the first, second and third recesses 615A, 615B, 615C may be, for example, further recessed into the shaft portion 611 of the arbor 610, with raised portions extending between adjacent recesses 615A and 615B, and between adjacent recesses 615B and 615C, to define the recesses 615A, 615B, 615C and facilitate the retention of the detent 642 in the recesses 615A, 615B, 615C. The detent 642 may engage the first recess 615A to retain the sleeve 640 in a first position, may engage the second recess 615B to retain the sleeve 640 in a second position, and may engage the third recess 615C to retain the sleeve 640 in a third position. The at least one detent 642 may be similarly structured to the detents 342 of the example hole saw 300 described above, and may interact with the recesses 615A, 615B, 615C in a similar manner as described above with respect to FIGS. 3A-4C. The detent 642 may include a spring 643 that biases a ball (not shown in FIGS. 6A-6C) radially inward, forcing the ball into one of the recesses 615A, 615B, 615C defined in the groove 613, based on a position of the sleeve 640. Engagement of the ball in one of the recesses 615A, 615B, 615C maintains a selected position of the sleeve 640 relative to the shaft portion 611 of the arbor 610.

In some implementations, one or more flat portions 614 may be defined on the shaft portion 611 of the arbor 610. For example, as shown in FIG. 6C, first and second flat portions 614 are formed on opposite outer circumferential portions of the shaft portion 611. In some implementations, the one or more flat portions 614 may provide for indexing in coupling the hole saw 630 to the arbor 310, and may form an anti-rotation feature that restricts rotation of the sleeve 640 relative to the shaft portion 611 of the arbor 610. In some implementations, a biasing device 646 such as, for example, a spring 646, may be positioned between the shaft portion 611 and the sleeve 640, exerting a biasing force on the sleeve 640 that biases the sleeve 640 towards the hole saw 630.

In some implementations, one or more drive projections 644, or protrusions 644, extend outward, for example, in an axial direction, from an end portion of the sleeve 640, toward the hole saw 630. The drive projections 644 may be selectively received in corresponding openings 634 formed in the hole saw 630. The drive projections 644, openings 634, and interaction therebetween may be similar to the drive projections 344 and openings 334 described above with respect to the hole saw 300 shown in FIGS. 3A-4C. Insertion of the drive projections 644 into the openings 634 in the hole saw 630 maintain a position of the hole saw 630 relative to the arbor 610, and allow a driving force to be transferred to the hole saw 630 for operation on a workpiece. In some implementations, the insertion of the drive projections 644 into the openings 634 maintains a rotational position of the hole saw 630 that has been threadably coupled on to the threaded coupling portion 616 of the arbor 610 to provide for the transfer of driving force to the hole saw 630 and restrict further rotation of the hole saw 630 on the threaded coupling portion 616 of the arbor 610 during operation of the hole saw 600. Without restricting further rotation of the hole saw 630 relative to the arbor 610 in this manner, further rotation of the hole saw 630 on the threaded coupling portion 616 during operation can cause the hole saw 630 to be seized on the threaded coupling portion 616, making the hole saw 630 difficult to remove from the arbor 610 without additional tooling.

FIG. 7A illustrates a first configuration of the example hole saw 600. In particular, FIG. 7A(1) is a partial side view of the example hole saw 600, and FIG. 7A(2) is a cross-sectional view, illustrating a first position of the sleeve 640 relative to the shaft portion 611 of the arbor 610, corresponding to a first mode of the arbor 610.

In the first position of the sleeve 640 relative to the shaft portion 611 of the arbor 610, both the pilot drill bit 620 and the hole saw 630 are fixed to, or retained by the arbor 610. In the first position, the spring 643 biases the ball (not shown in FIGS. 7A-7C) of each the detent 642 into first recess 615A of the groove 613. The engagement of the detent 642 in the first recess 615A maintains the first position of the sleeve 640 relative to the shaft portion 611 of the arbor 610.

In this first position, the sleeve 640 is axially positioned adjacent to the hole saw 630, and each of the drive projections 644 is received in the respective opening 634 in the annular saw blade 630. This arrangement precludes the unthreading and decoupling of the hole saw 630 from the arbor 610, thus fixing the coupling of the hole saw 630 to the arbor 610. In the first position, the pilot drill bit 620 is fixed or retained in the recess defining the second coupling portion 618 by the engagement of a retention member 349 with a retention recess (not shown in FIGS. 7A(1) and 7A(2)) formed in a corresponding end portion of the pilot drill bit 620. This restricts axial movement of the pilot drill bit 620 relative to the arbor 610, thus locking the pilot drill bit 620 in the arbor 610 and preventing release of the pilot drill bit 620 from the arbor 610. When the hole saw 600 is coupled to a power-driven tool, the hole saw 600 having both the pilot drill bit 620 and the hole saw 630 fixed to the arbor 610 by the positioning of the sleeve 640 in the first position as described above may be in an operational state, or a locked state, allowing the hole saw 600 to perform an operation on a workpiece in response to a driving force generated by the power-driven tool.

FIG. 7B illustrates a second configuration of the example hole saw 600. In particular, FIG. 7B(1) is a partial side view of the example hole saw accessory 600, and FIG. 7B(2) is a cross-sectional view, illustrating a second position of the sleeve 640 relative to the shaft portion 611 of the arbor 610, corresponding to a second mode of the arbor.

An external pulling or sliding force, for example in the direction of the arrow F1, may be exerted on the sleeve 640 to move the sleeve 640 axially relative to the shaft portion 611 of the arbor 610, from the first position shown in FIGS. 7A(1) and 7A(2) to the second position shown in FIGS. 7B(1) and 7B(2). Axial sliding movement from the first position to the second position of the sleeve 640 releases engagement between the detent 642 and the first recess 615A, and the contour of the groove 613 guides the detent 642 into engagement with the second recess 615B to retain the sleeve 640 in the second position. In this second position, due to the axial movement of the sleeve 640 away from the annular saw blade 630, the drive projections 644 have been removed out of the respective openings 634 in the hole saw 630. This movement of the sleeve 640 away from the hole saw 630 and removal of the drive projections 644 from the openings 634 releases the hole saw 630 from the sleeve 640, and allows the hole saw 630 to be decoupled from the threaded coupling portion 616 of the arbor 610, thus allowing for removal of the hole saw 630 from the arbor 610 and/or replacement of the hole saw 630. In the second position, the pilot drill bit 620 remains fixed in the recess defining the second coupling portion 618 by the engagement of the retention member 349 in the retention recess (not shown in FIGS. 7B(1) and 7B(2)) formed in the end portion of the pilot drill bit 620. Thus, in the second position, the hole saw 630 can be removed and/or replaced independently from the pilot drill bit 620, without also necessarily involving disengagement of the pilot drill bit 620.

FIG. 7C illustrates a third configuration of the example hole saw 600. In particular, FIG. 7C(1) is a partial side view, and FIG. 7C(2) is a cross-sectional view, of the example hole saw accessory 600, illustrating a third position of the sleeve 640 relative to the shaft portion 611 of the arbor 610, corresponding to a third mode of the arbor 610.

An external force, for example in the direction of the arrow F2, may be exerted on the sleeve 640 to rotate the sleeve 640 relative to the shaft portion 611 of the arbor 610, from the second position shown in FIG. 7B to the third position shown in FIGS. 7C(1) and 7C(2). Rotation from the first position to the second position of the sleeve 640 releases engagement between the detent 642 and the second recess 615B, and the contour of the groove 613 guides the detent 642 into engagement with the third recess 615C to retain the sleeve 640 in the third position. In the third position of the sleeve 640 relative to the shaft portion 611 of the arbor 610, the biasing force exerted on the ball by the spring 643 biases the detent 642 into the third recess 615C to maintain the third position of the sleeve 640 relative to the shaft portion 611 of the arbor 610. In this third position, the drive projections 644 remain removed from the respective openings 634 in the hole saw 630. The hole saw 630 can also be decoupled from the threaded coupling portion 616 of the arbor 610 when the sleeve 640 is in the third position relative to the arbor 610. In some implementations, in the third position, a cutaway portion (not shown in FIGS. 7C(1) and 7C(2)) of the sleeve 640 may allow the retention member 649 to move out of engagement with the retention recess (not shown in FIGS. 7C(1) and 7C(2)) formed in the end portion of the pilot drill bit 620, thus releasing the pilot drill bit 620 from the arbor 610 and allowing for removal and replacement of the pilot drill bit 620. In some implementations, the inner peripheral contour of the sleeve 640 (visible in the cross-sectional views shown in FIGS. 7A(2), 7B(2) and 7C(2)), defined by two flat portions separated by two curved portions to define a double D shape may allow for the sleeve 640 to provide space for the retention member 649 to disengage the retention recess and move radially outward, from the retained positions shown in FIGS. 7A(2) and 7B(2), to the release position shown in FIG. 7C(2). Thus, in the third position of the sleeve 640 relative to the shaft portion 611 of the arbor 610, the pilot drill bit 620 can be removed and/or replaced independently from the hole saw 630, without also necessarily involving disengagement of the hole saw 630.

The ability to quickly release the pilot drill bit 620, and to quickly release the hole saw 630, independently from each other, and without the use of additional tools and/or mechanisms, enhances utility and functionality of the hole saw accessory 600, and improves the operator experience with the use of the hole saw accessory 600.

Figure 8A:
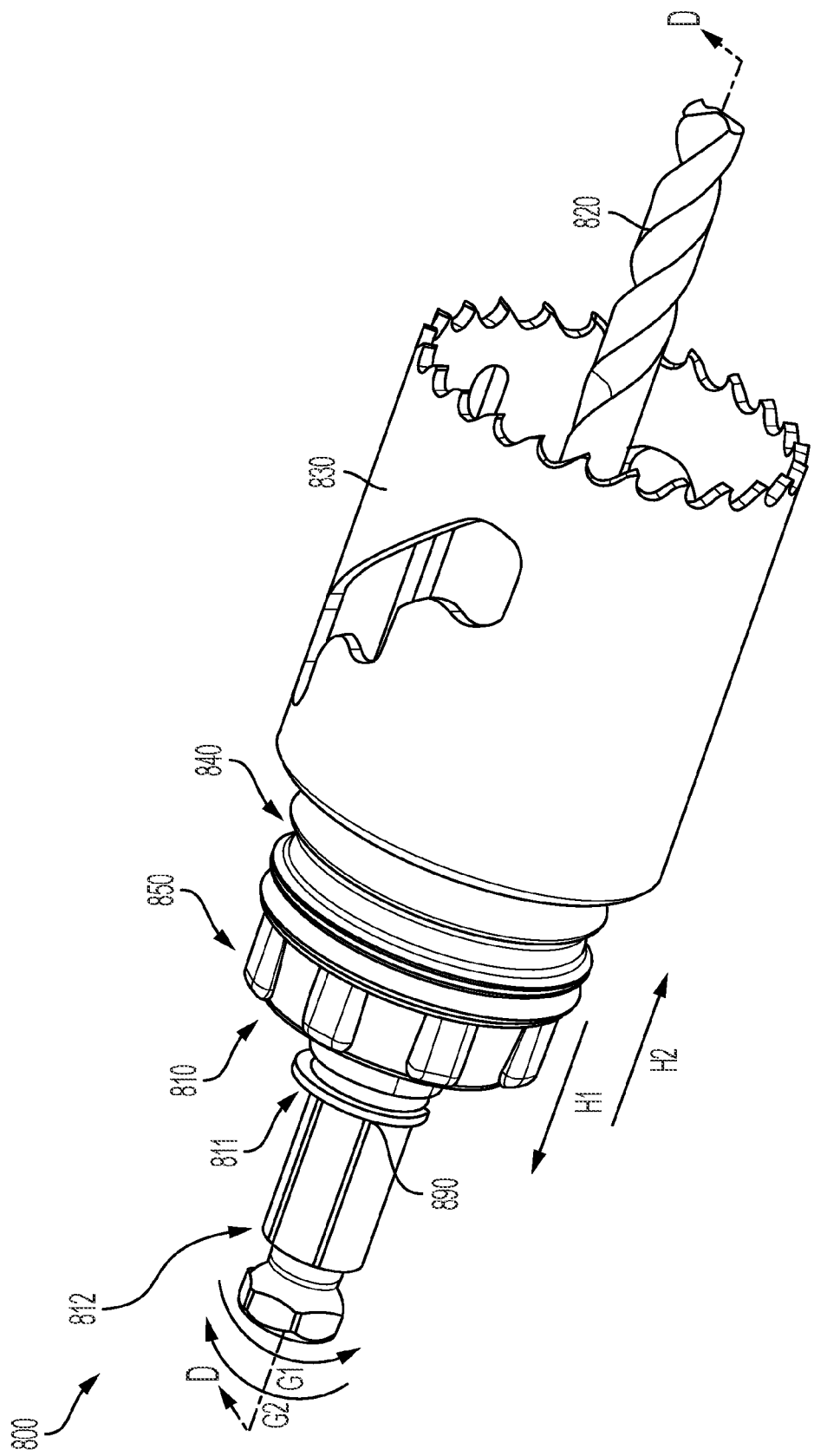
FIG. 8A is a perspective view of an example accessory device, in accordance with implementations described herein.
Figure 8B:
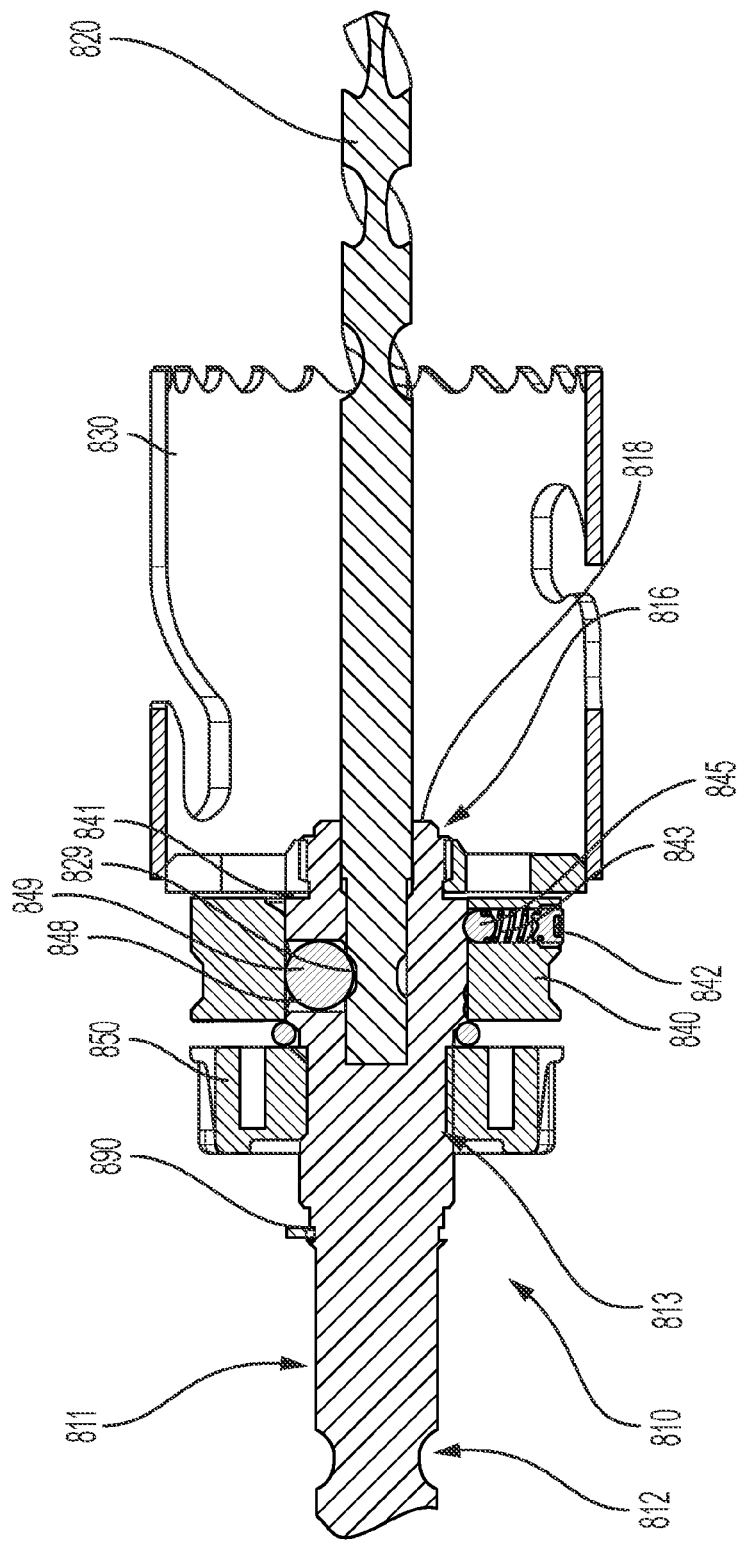
FIG. 8B is a cross-sectional view of the example accessory device shown in FIG. 8A, taken along line D-D of FIG. 8A.
Figure 9A:
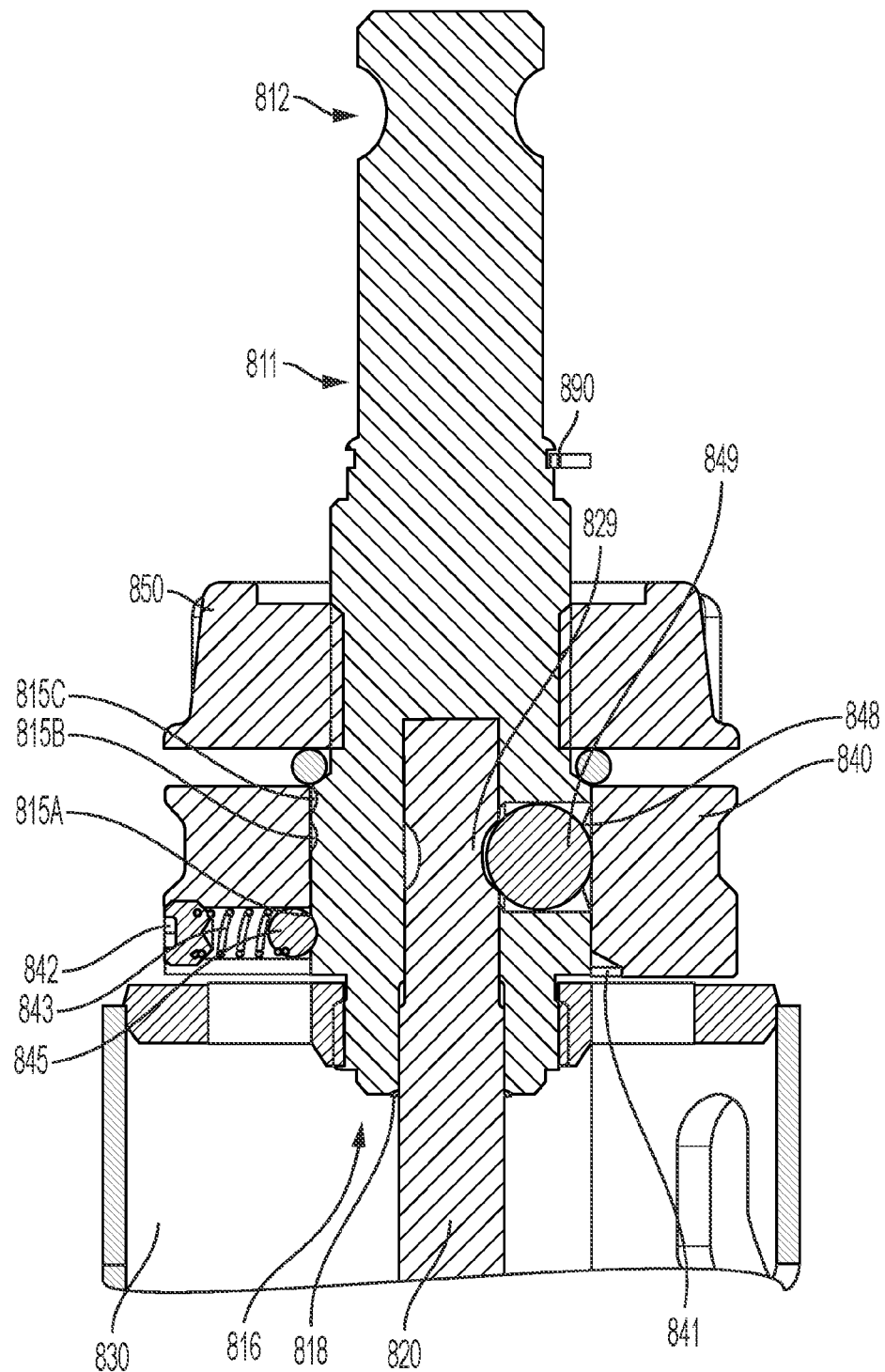
FIGS. 9A-9C are partial cross-sectional views of the example accessory device shown in FIG. 8A, taken long line D-D of FIG. 8A, in first, second and third configurations of the example accessory device.
Figure 9B:
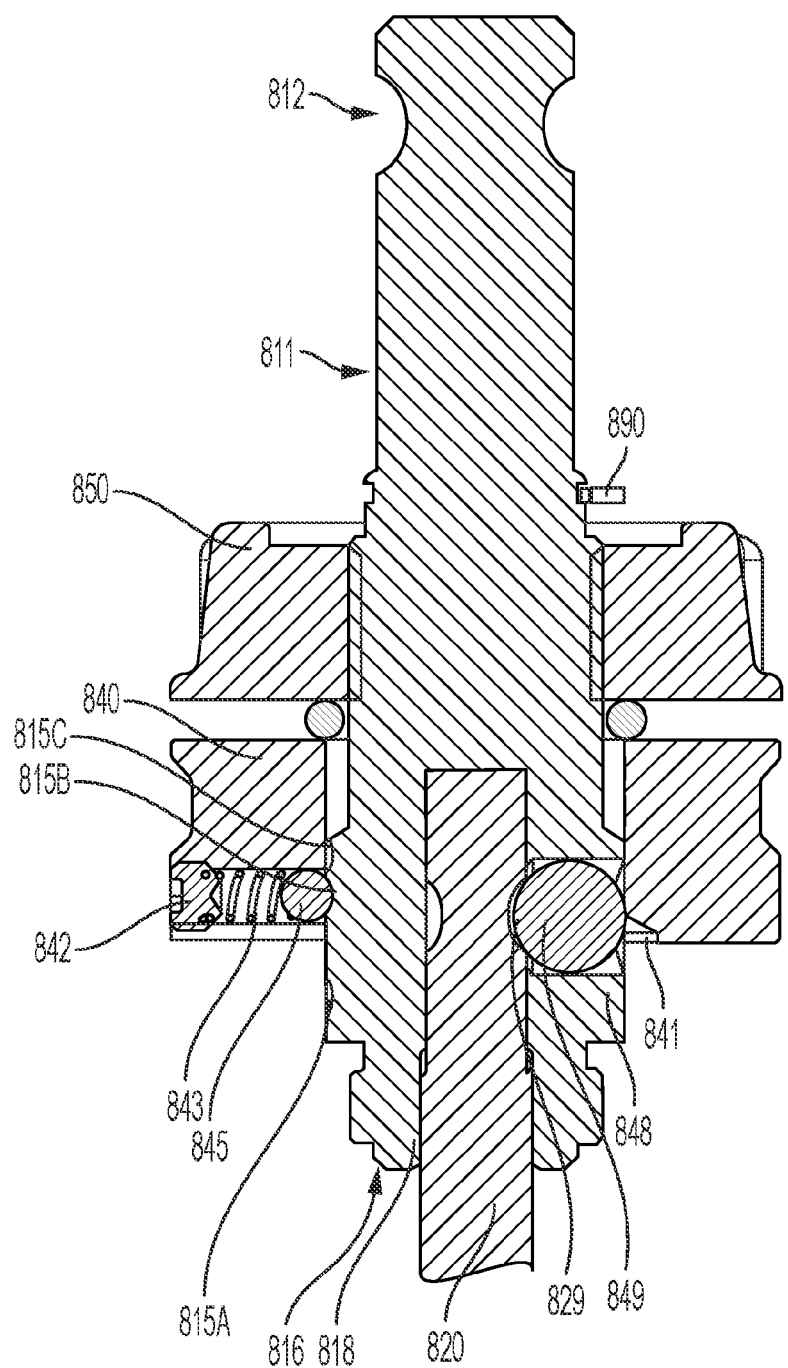
Figure 9C:
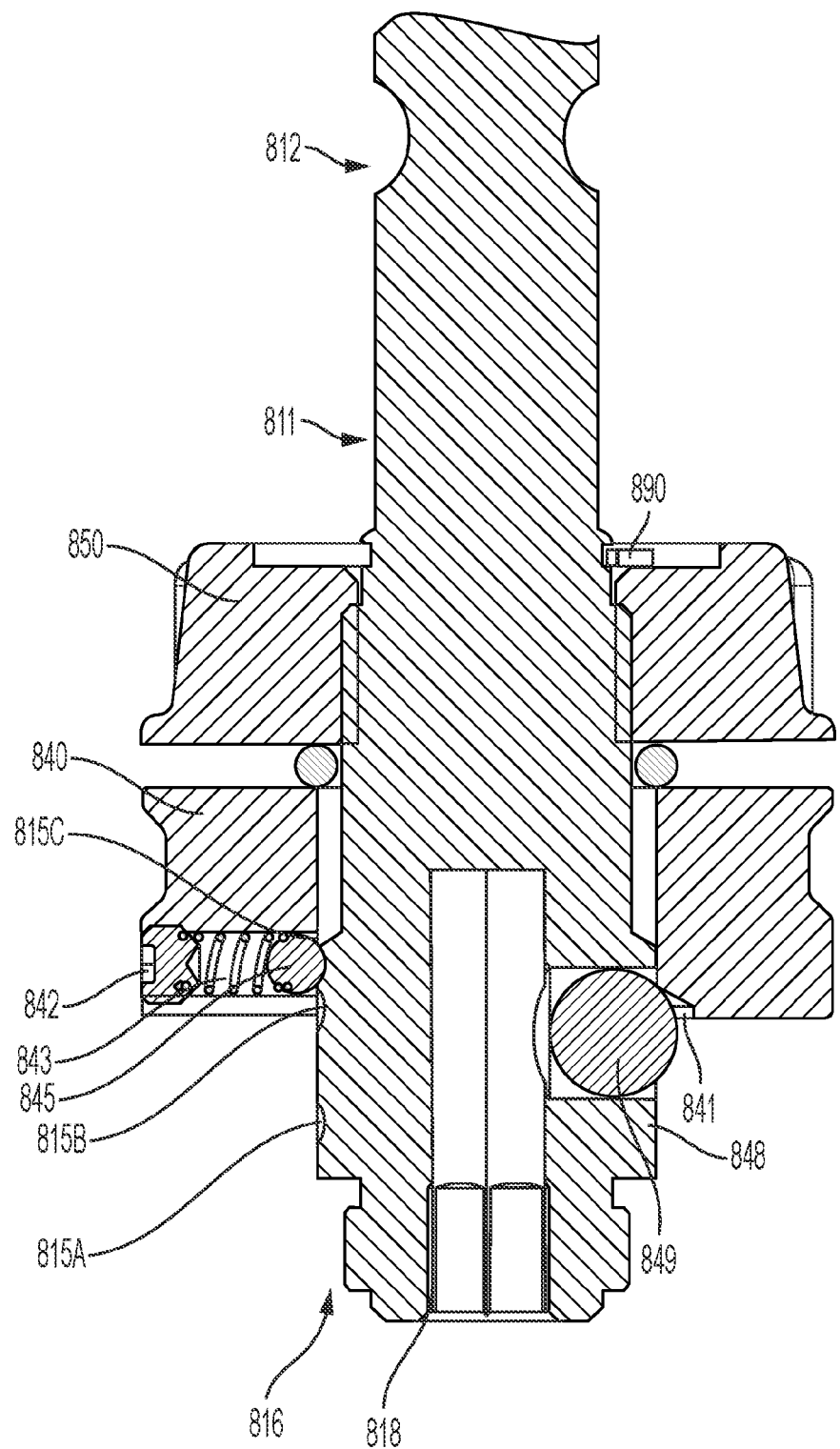

FIG. 8A is a perspective view of an example accessory device 800, in the form of an example hole saw accessory 800, in accordance with implementations described herein. FIG. 8B is a cross sectional view of the example hole saw accessory 800, taken along line D-D of FIG. 8A. FIGS. 9A-9C are partial cross-sectional views of the example hole saw accessory 800, taken along line D-D of FIG. 8A.

The example hole saw accessory 800 shown in FIGS. 8A and 8B includes an arbor 810 having a first coupling portion 812 at a first end of a shaft portion 811 of the arbor 810, and a second coupling portion 818 at a second end of the shaft portion 811. A first threaded coupling portion 813 is formed at an intermediate portion of the shaft portion 811 of the arbor, and a second threaded coupling portion 816 is formed at the second end of the shaft portion 811. The first coupling portion 812 is configured to be coupled to an output mechanism of a power-driven tool. The second coupling portion 818, defined by a bore extending axially into the shaft portion 811 of the arbor 810 form an opening at a second end portion of the arbor 810, provides for coupling of a pilot drill bit 820 to the arbor 810. The first threaded coupling portion 813 provides for the movable coupling of a threaded coupler 850 to the shaft portion 811 of the arbor 810. The second threaded coupling portion 816 provides for the coupling of an A, or hole saw 830, to the arbor 810. A sleeve 840 is positioned on an outer facing side of the shaft portion 811 of the arbor 810, between the threaded coupler 850 and the hole saw 830.

Engagement of the threaded coupler 850 with the first threaded coupling portion 813 may provide for axial movement of the threaded coupler 850 relative to the shaft portion 811 of the arbor 810. For example, the threaded coupler 850 may move axially, in the direction of the arrow H1, along the shaft portion 811 of the arbor 810 in response to rotation of the threaded coupler 850, in the direction of the arrow G1, on the first threaded coupling portion 813. In some implementations, the threaded coupler 850 may move axially in the direction H1 to an indexing device 890 positioned on the shaft portion 811 of the arbor 810. Similarly, the threaded coupler 850 may move axially, in the direction of the arrow H2, along the shaft portion 811 of the arbor 810 in response to rotation of the threaded coupler 850, in the direction of the arrow G2, on the first threaded coupling portion 813. Movement of the threaded coupler 850 away from the sleeve 840 may allow for axial movement of the sleeve 840 away from the matin surface of the hole saw 830.

At least one detent 842 extends radially through the sleeve to selectively engage one of a plurality of grooves 815, or recesses 815 formed in a corresponding outer circumferential portion of the shaft portion 811 of the arbor 810. The example hole saw 800 shown in FIGS. 8A-9C includes first, second and third recesses 815A, 815B and 815C. In some implementations, the at least one detent 842 includes a biasing device 843, or spring 843 that exerts a biasing force on a retention device 845, for example, a ball 845. The spring 843 biases the ball 845 radially inward, forcing the ball 845 into one of the recesses 815, depending on a position of the sleeve 840 relative to the shaft portion 811 of the arbor 810. Engagement of the ball 845 in one of the recesses 815 maintains a selected position of the sleeve 840 on the shaft portion 811 of the arbor 810.

In some implementations, a retention member 849 may be positioned in a retention passage 848 extending radially in the shaft portion 811 of the arbor 810. The retention member 849 may selectively engage a retention recess 829 defined in an end portion of the pilot drill bit 820 to retain the pilot drill bit 820 in the second coupling portion 818 of the arbor 810. Alignment of a cutaway portion of the sleeve 840 may allow for radial movement of the retention member 849 in the retention passage 848, and disengagement of the retention member 849 from the retention recess 829 of the pilot drill bit 820.

FIG. 9A is a cross-sectional view of the example hole saw accessory 800 shown in FIGS. 8A and 8B with the sleeve 840 and the threaded coupler 850 in a first position relative to the shaft portion 811 of the arbor 810, corresponding to a first mode of the arbor 810.

In the first position of the sleeve 840 and the threaded coupler 850 relative to the shaft portion 811 of the arbor 810, both the pilot drill bit 820 and the hole saw 830 are fixed to, or retained by the arbor 810. In the first position of the sleeve 840 and the threaded coupler 850, the ball 845 of the detent 842 is biased, or urged into the first recess 815A in response to the biasing force exerted on the ball 845 by the spring 843. The engagement of the detent 842 in the first recess 815A maintains the first position of the sleeve 340 relative to the shaft portion 311 of the arbor 310.

In this first position, the sleeve 840 is axially positioned adjacent to the hole saw 830, and the sleeve 840 may be retained in this position by the engagement of the detent 842 in the first recess 815, and the position of the threaded coupler 850 adjacent to the sleeve 840. This arrangement precludes the unthreading and decoupling of the hole saw 830 from the arbor 810, thus fixing the coupling of the hole saw 830 to the arbor 810. In the first position, the pilot drill bit 820 is fixed or retained in the recess defining the second coupling portion 818 by the engagement of the retention member 849 in the retention recess 829 of the pilot drill bit 820. The engagement of the retention member 849 in the retention recess 829 restricts axial movement of the pilot drill bit 820 relative to the arbor 810, thus locking the pilot drill bit 820 in the arbor 810 and preventing release of the pilot drill bit 820 from the arbor 810. When the hole saw 800 is coupled to a power-driven tool, the hole saw 800 having both the pilot drill bit 820 and the hole saw 830 fixed to the arbor 810 by the positioning of the sleeve 840 and the threaded coupler 850 in the first position shown in FIG. 9A may be in an operational state, or a locked state, allowing the hole saw 800 to perform an operation on a workpiece in response to a driving force generated by the power-driven tool.

FIG. 9B is a cross-sectional view of the example hole saw accessory 800 shown in FIGS. 8A and 8B with the sleeve 840 and the threaded coupler 850 in a second position relative to the shaft portion 811 of the arbor 810, corresponding to a second mode of the arbor 810.

In moving the elements of the hole saw 800 from the first position shown in FIG. 9A to the second position shown in FIG. 9B, the threaded coupler 850 may be rotated in a first direction relative to the shaft portion 811. Interaction between a threaded portion of the threaded coupler 850 and the first threaded coupling portion 813 defined on the shaft portion 811 as the threaded coupler 850 is rotated causes axial movement of the threaded coupler 850 away from the sleeve 840 (from the first position shown in FIG. 9A to the second position shown in FIG. 9B). Movement of the threaded coupler 850 away from the sleeve 840 allows the sleeve 840 to move axially along the shaft portion 811 in response to an external pulling or sliding force exerted on the sleeve 840 (from the first position shown in FIG. 9A to the second position shown in FIG. 9B). In the second position of the sleeve 840 and the threaded coupler 850, the ball 845 of the detent 842 is now biased, or urged into and retained in the second recess 815B. In this second position, the hole saw 830 can be rotated to decouple the hole saw 830 from the second threaded coupling portion 816 of the arbor 810, thus allowing for removal and/or replacement of the hole saw 830. In the second position, the pilot drill bit 820 remains fixed in the arbor 810 by the engagement of the retention member 849 in the retention recess 829 formed in the end portion of the pilot drill bit 820. Thus, in the second position shown in FIG. 9B, the hole saw 830 can be removed and/or replaced independently from the pilot drill bit 820, without also necessarily involving disengagement of the pilot drill bit 820.

FIG. 9C is a cross-sectional view of the example hole saw accessory 800 shown in FIGS. 8A and 8B with the sleeve 840 and the threaded coupler 850 in a third position relative to the shaft portion 811 of the arbor 810, corresponding to a third mode of the arbor 810.

In moving the elements of the hole saw 800 from the second position shown in FIG. 9B to the third position shown in FIG. 9C, the threaded coupler 850 may be further rotated in the first direction relative to the shaft portion 811. Interaction between the threaded portion of the threaded coupler 850 and the first threaded coupling portion 813 causes further axial movement of the threaded coupler 850 away from the sleeve 840 (from the second position shown in FIG. 9B to the third position shown in FIG. 9C). In some implementations, axial movement of the threaded coupler 850 on the shaft portion 811 of the arbor 810 may be restricted or limited by the indexing device 890. Movement of the threaded coupler 850 further away from the sleeve 840 allows the sleeve 840 to move further axially along the shaft portion 811 in response to an external pulling or sliding force exerted on the sleeve 840 (from the second position shown in FIG. 9B to the third position shown in FIG. 9C). In the third position of the sleeve 840 and the threaded coupler 850, the ball 845 of the detent 842 is now biased, or urged into and retained in the third recess 815C. In this third position, the hole saw 830 can still be rotated (as described above with respect to FIG. 9B) to release the hole saw 830 from the arbor 810. Alternatively, in the third position, the hole saw 830 may remain fixed to the arbor 810, and the pilot drill bit 820 may be released from the arbor 810 for removal and/or replacement of the pilot drill bit 820. That is, in the third position, the cutaway portion 841 of the sleeve 840 has been brought into position with the retention passage 848, allowing the retention member 849 to move radially in the passage 848 and out of the retention recess 829 formed in the end portion of the pilot drill bit 820. This movement of the retention member 849 releases the pilot drill bit 820 from the arbor 810 and allows for removal and replacement of the pilot drill bit 820. Thus, in the third position of the sleeve 840 and the threaded coupler 850 relative to the shaft portion 811 of the arbor 810, the pilot drill bit 820 can be removed and/or replaced independently from the hole saw 830, without also necessarily involving disengagement of the hole saw 830.

The ability to quickly release the pilot drill bit 820, and to quickly release the hole saw 830, independently from each other, and without the use of additional tools and/or mechanisms, enhances utility and functionality of the hole saw accessory 800, and improves the operator experience with the use of the hole saw accessory 800.

FIGS. 10A-10C illustrate an example pilot drill bit 1000 for use with one of the quick release hole saw accessory devices described above. FIGS. 10A and 10B are perspective views from different sides of the example pilot drill bit 1000. FIG. 10C is a cross-sectional view illustrating installation of the example pilot drill bit 1000 in an arbor of one of the quick release hole saw accessory devices described above. Simply for ease of discussion and illustration, the installation of the example pilot drill bit 1000 will be described with respect to components of the example arbor 310 shown in FIGS. 3A-4C; however, the example pilot drill bit 1000 can be installed in other hole saw accessory devices.

The example pilot drill bit 1000 shown in FIGS. 10A and 10B includes a shank portion 1010 including a retention recess 1020 and a flat portion 1040, with a fluted cutting portion 1015 extending from the shank portion 1010. The retention recess 1020 and the flat portion 1040 are formed at a coupling end portion of the pilot drill bit 1000 that is received in the second coupling portion 318 of the arbor 310. As shown in FIG. 10C, the retention recess 1020 engages with the retention member 349 positioned in the retention passage 348 formed in the shaft portion 311 of the arbor 310 to retain the pilot drill bit 1000 in the arbor 310. In some implementations, a set screw 1050 may extend through the shaft portion 311 and engage the flat portion 1040 of the pilot drill bit 1000. In this arrangement, the engagement of the retention member 349 and the retention recess 1020 may restrict axial motion of the pilot drill bit 1000 in the arbor 310 and prevent release from the arbor 310, while the engagement of the set screw 1050 and the flat portion 1040 of the pilot drill bit 1000 may restrict rotation of the pilot drill bit 1000 within the arbor 310. The engagement of the retention member 349 and the retention recess 1020, together with the engagement of the set screw 1050 and the flat portion 1040, may provide for the driving of the pilot drill bit 1000. The inclusion of both the retention recess 1020 and the flat portion 1040 on the coupling end portion of the pilot drill bit 1000 allows the pilot drill bit 1000 to be used with a hole saw including quick release features as described above, with or without the use of a set screw, and also with a standard accessory device that relies on the interaction between the set screw 1050 and the flat portion 1040 of the pilot drill bit 1000 for both anti-rotation and retention features.

FIGS. 11A-11C illustrate an example pilot drill bit 1100 for use with one of the quick release hole saw accessory devices described above. FIGS. 11A and 11B are perspective views from different sides of the example pilot drill bit 1100. FIG. 11C is a cross-sectional view illustrating installation of the example pilot drill bit 1100 in an arbor of one of the quick release hole saw accessory devices described above. Simply for ease of discussion and illustration, the installation of the example pilot drill bit 1100 will be described with respect to components of the example arbor 310 shown in FIGS. 3A-4C; however, the example pilot drill bit 1100 can be installed in other hole saw accessory devices.

The example pilot drill bit 1100 shown in FIGS. 11A and 11B includes a shank portion 1110 including a flat portion 1140 and a plurality of retention recesses 1120, and a fluted cutting portion 1115 extending from the shank portion 1110. In the example shown in FIGS. 11A-11C, the pilot drill bit 1100 includes four retention recesses 1120. The retention recesses 1120 and the flat portion 1140 are formed at a coupling end portion of the pilot drill bit 1100 that is received in the second coupling portion 318 of the arbor 310. In the example shown in FIGS. 11A-11C, the flat portion 1140 extends substantially to a proximal end of the pilot drill bit 1100, with one of the retention recesses 1120 formed in the flat portion 1140. As shown in FIG. 11C, one of the four retention recesses 1120 engages with the retention member 349 positioned in the retention passage 348 formed in the shaft portion 311 of the arbor 310 to retain the pilot drill bit 1100 in the arbor 310. In the example arrangement shown in FIGS. 11A-11C, when used with an accessory device including quick release features as described above, engagement between one of the retention recesses 1120 and the retention member 349 provides for both axial retention and anti-rotation of the pilot drill bit 1100 in the arbor 310, and also provides for the driving of the pilot drill bit 1100. When used with a standard accessory device, a set screw (not shown in FIG. 11C) may interact with the flat portion 1140 of the pilot drill bit 1100 to provide for both anti-rotation and retention features.

FIGS. 12A-12C illustrate an example pilot drill bit 1200 for use with one of the quick release hole saw accessory devices described above. FIGS. 12A and 12B are perspective views from different sides of the example pilot drill bit 1200. FIG. 12C is a cross-sectional view illustrating installation of the example pilot drill bit 1200 in an arbor of one of the quick release hole saw accessory devices described above. Simply for ease of discussion and illustration, the installation of the example pilot drill bit 1200 will be described with respect to components of the example arbor 310 shown in FIGS. 3A-4C; however, the example pilot drill bit 1200 can be installed in other hole saw accessory devices.

The example pilot drill bit 1200 shown in FIGS. 12A and 12B includes a shank portion 1210 including a plurality of retention recesses 1220, and a flat portion 1240 positioned below one of the plurality of retention recesses 1220 (in the orientation shown in FIGS. 12A and 12B), and a fluted cutting portion 1215 extending from the shank portion 1210. In the example shown in FIGS. 12A-12C, the pilot drill bit 1200 includes four retention recesses 1220. The retention recesses 1220 and the flat portion 1240 are formed at a coupling end portion of the pilot drill bit 1200 that is received in the second coupling portion 318 of the arbor 310. As shown in FIG. 12C, one of the four retention recesses 1220 engages with the retention member 349 positioned in the retention passage 348 formed in the shaft portion 311 of the arbor 310 to retain the pilot drill bit 1200 in the arbor 310. In the example installation shown in FIG. 12C, with the retention recess 1220 above the flat portion 1240 aligned with the retention member 349, improved axial retention and anti-rotation features may be provided due to improved engagement over a greater mating surface area/greater interaction between the retention recess 1220 and the retention member 349 (compared to an arrangement in which the retention recess is formed in the flat portion of the pilot drill bit). In the example arrangement shown in FIGS. 12A-12C, when used with an accessory device including quick release features as described above, engagement between one of the retention recesses 1220 and the retention member 349 provides for both axial retention and anti-rotation of the pilot drill bit 1200 in the arbor 310, and also provides for the driving of the pilot drill bit 1200. When used with a standard accessory device, a set screw (not shown in FIG. 12C) may interact with the flat portion 1240 of the pilot drill bit 1200 to provide for both anti-rotation and retention features.

Figure 13A:
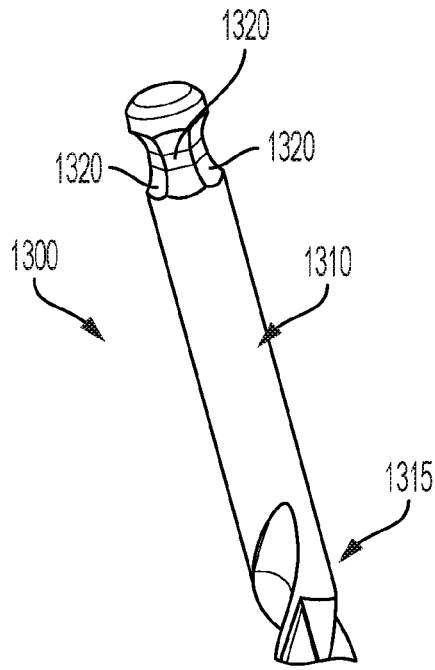
FIGS. 13A and 13B are perspective views of an example pilot drill bit for use with a quick release hole saw accessory device, in accordance with implementations described herein.
Figure 13B:
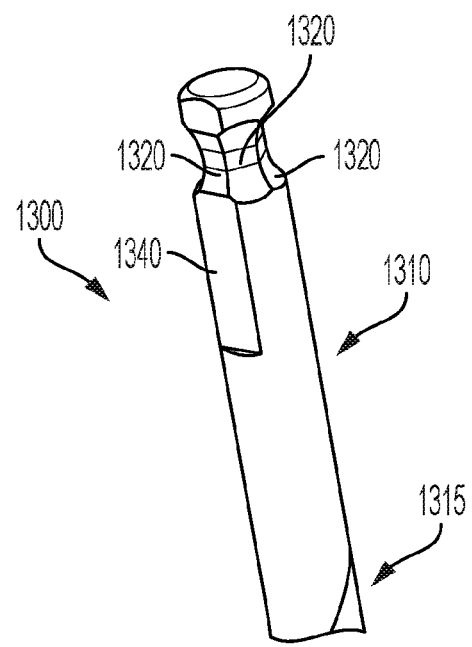
Figure 13C:
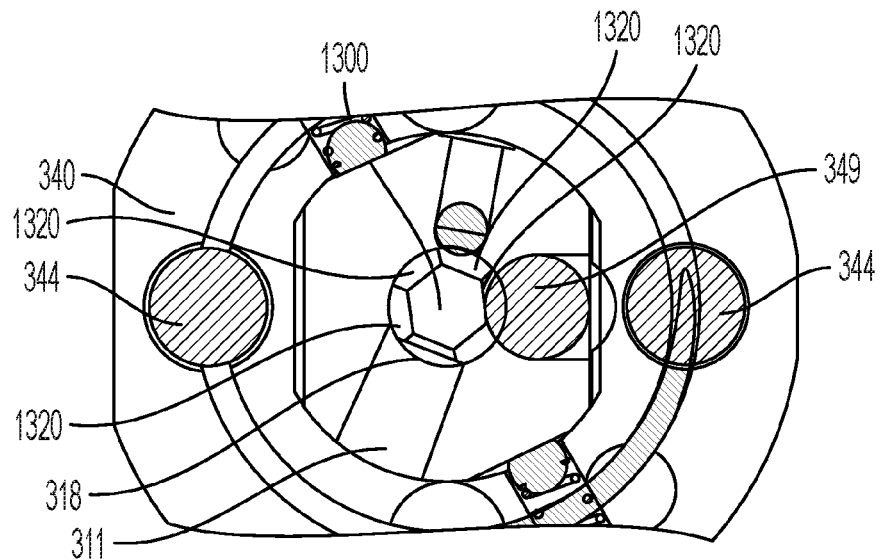
FIG. 13C is a cross-sectional view of an installation of the example pilot drill bit shown in FIGS. 13A and 13B in an example quick release hole saw accessory device, in accordance with implementations described herein.

FIGS. 13A-13C illustrate an example pilot drill bit 1300 for use with one of the quick release hole saw accessory devices described above. FIGS. 13A and 13B are perspective views from different sides of the example pilot drill bit 1300. FIG. 13C is a cross-sectional view illustrating installation of the example pilot drill bit 1300 in an arbor of one of the quick release hole saw accessory devices described above. Simply for ease of discussion and illustration, the installation of the example pilot drill bit 1300 will be described with respect to components of the example arbor 310 shown in FIGS. 3A-4C; however, the example pilot drill bit 1300 can be installed in other hole saw accessory devices.

The example pilot drill bit 1300 shown in FIGS. 13A and 13B includes a shank portion 1310 including a plurality of recessed retention segments 1320, and a flat portion 1340 positioned below one of the plurality of recessed retention segments 1320 (in the orientation shown in FIGS. 13A and 13B), and a fluted cutting portion 1315 extending from the shank portion 1310. In the example shown in FIGS. 13A-13C, the pilot drill bit 1300 includes six recessed retention segments 1320 defining a hexagonal cross-section. The recessed retention segments 1320 and the flat portion 1340 are formed at a coupling end portion of the pilot drill bit 1300 that is received in the second coupling portion 318 of the arbor 310.

As shown in FIG. 13C, one of the recessed retention segments 1320 engages with the retention member 349 positioned in the retention passage 348 formed in the shaft portion 311 of the arbor 310 to retain the pilot drill bit 1300 in the arbor 310. In the example arrangement shown in FIGS. 13A-13C, when used with an accessory device including quick release features as described above, engagement between one of the recessed retention segments 1320 and the retention member 349 provides for both axial retention and anti-rotation of the pilot drill bit 1300 in the arbor 310, and also provides for the driving of the pilot drill bit 1300. When used with a standard accessory device, a set screw (not shown in FIG. 13C) may interact with the flat portion 1340 of the pilot drill bit 1300 to provide for both anti-rotation and retention features.

Figure 14B:
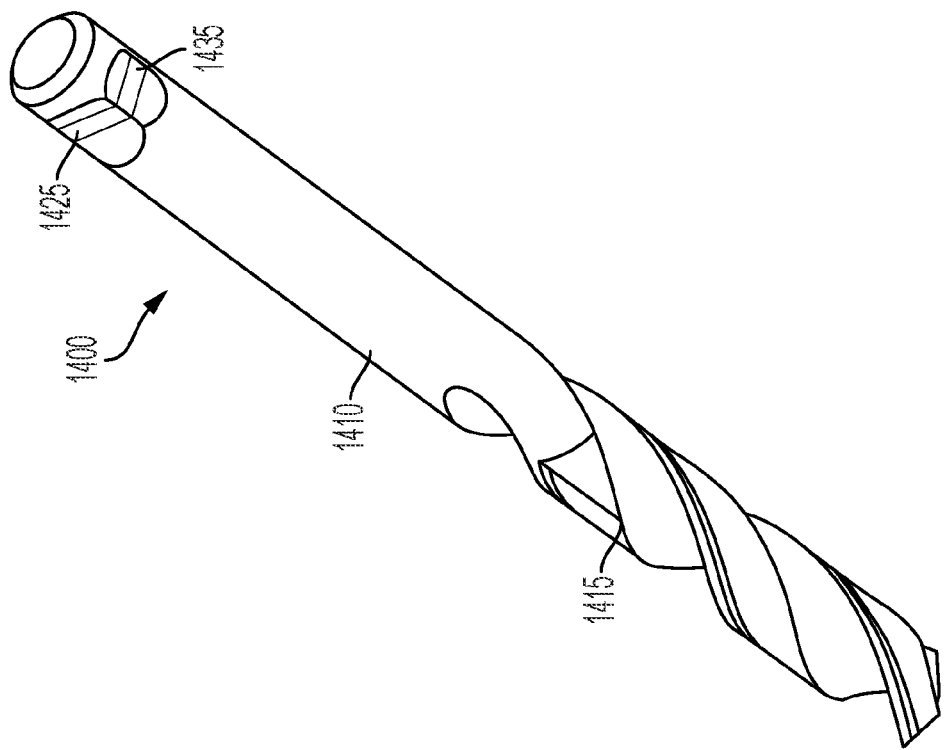
FIGS. 14A and 14B are perspective views of an example pilot drill bit for use with a quick release hole saw accessory device, in accordance with implementations described herein.
Figure 14A:
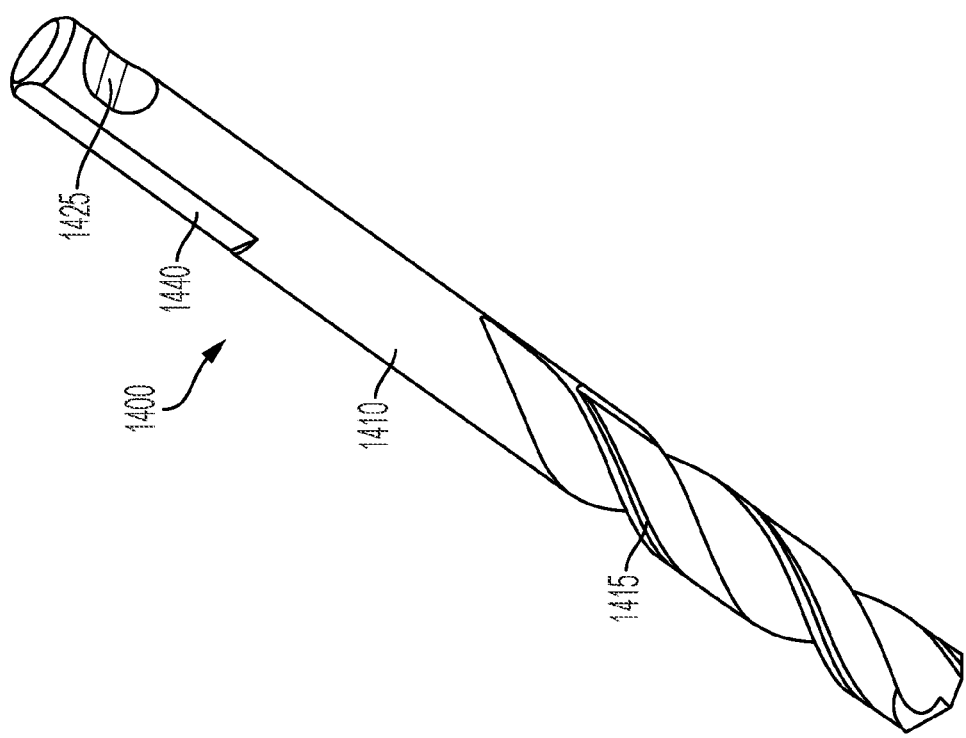

FIGS. 14A and 14B illustrate another example pilot drill bit 1400. The example pilot drill bit 1400 may be used with one of the quick release hole saw accessory devices described above. FIGS. 14A and 14B are perspective views from different sides of the example pilot drill bit 1400.

The example pilot drill bit 1400 includes a shank portion 1410. A flat portion 1440 and a plurality of recesses 1425, 1435 are formed at a first end portion of the shank portion 1410 defining a coupling end portion of the pilot drill bit 1400 (i.e., an end portion of the pilot drill bit 1400 configured to be received in the second coupling portion 318 of the example arbor 310 described above with respect to FIGS. 3A-3C). A fluted cutting portion 1415 is provided at a second end portion of the shank portion 1410. In the example shown in FIGS. 14A and 14B, the flat portion 1440 extends substantially to a proximal end of the pilot drill bit 1400. In the example shown in FIGS. 14A and 14B, a first recess 1425 is formed approximately 90 degrees from the flat portion 1440, and a second recess 1435 is formed approximately 90 degrees from the first recess 1425, and approximately 180 degrees from the flat portion 1440. In some examples, the second recess 1435 is smaller than the first recess 1425.

Use of the pilot example pilot drill bit 1400 shown in FIGS. 14A and 14B will be described with respect to the example hole cutting accessory 300 including the arbor 310 described above with respect to FIGS. 3A-3C, simply for purposes of discussion and illustration. The principles to be described hereinafter with respect to the example pilot drill bit 1400 can be applied to use with other hole cutting accessories.

Figure 15A:
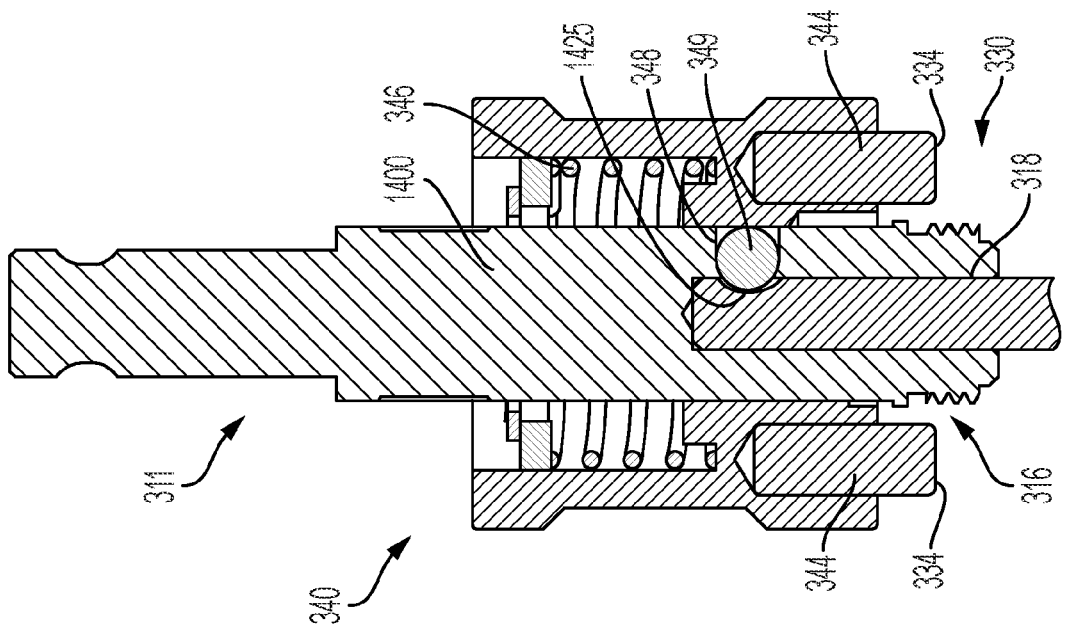
Figure 15B:
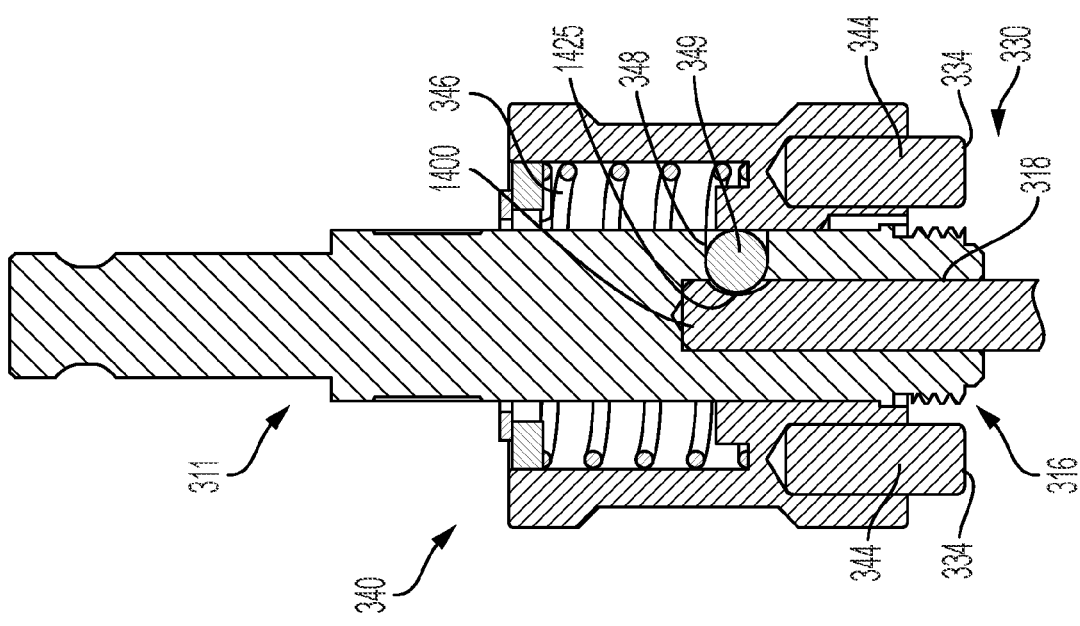
Figure 15D:
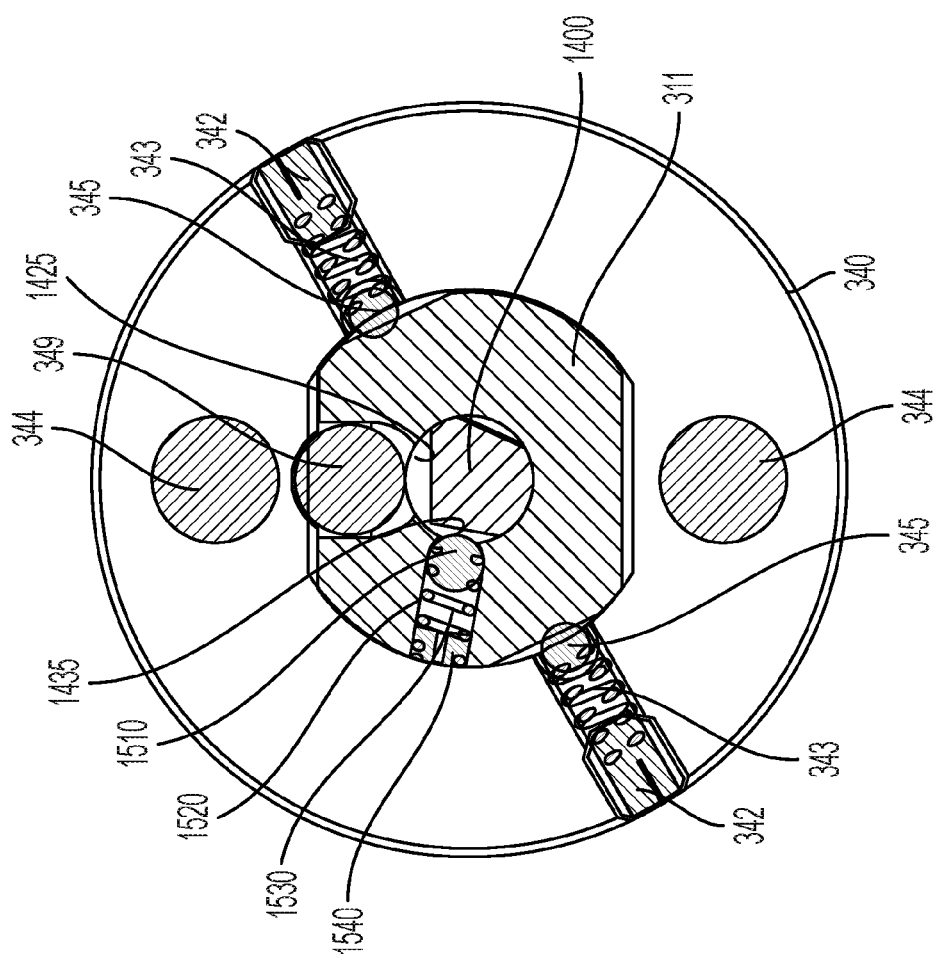

FIGS. 15A-15C are cross-sectional views of the example pilot drill bit 1400 installed in the example arbor 310. FIG. 15D is a cross-sectional view taken along line M-M of FIG. 15A. FIG. 15A illustrates the example hole saw 300, with the sleeve 340 in a first position relative to the shaft portion 311 of the arbor 310 corresponding to a first mode of the arbor 310. In the first position, both the pilot drill bit 1400 and the hole saw 330 are fixed to the arbor 310 by the positioning of the sleeve 340 in the first position as described above. This may be considered an operational state, or a locked state, allowing the hole saw 300 to perform an operation on a workpiece in response to a driving force generated by the power-driven tool. FIG. 15B illustrates the example hole saw 300 with the sleeve 340 in a second position relative to the shaft portion 311 of the arbor 310 corresponding to a second mode of the arbor 310 that allows the hole saw 330 to be decoupled from the threaded coupling portion 316 of the arbor 310, thus allowing for removal and/or replacement of the hole saw 330 from the arbor 310. FIGS. 15C(1) and 15C(2) illustrate the example hole saw 330 with the sleeve in a third position relative to the shaft portion 311 of the arbor corresponding to a third mode of the arbor 310 that allows for removal and/or replacement of the pilot drill bit 1400 from the arbor 310, independent from removal and/or replacement of the hole saw 330 from the arbor 310.

In the first position, the biasing force exerted by each spring 343 on the respective ball 345 of each of the detents 342 biases the balls 345 into the respective first recess 315A to maintain the first position of the sleeve 340 relative to the shaft portion 311 of the arbor 310. In this first position, the sleeve 340 is axially positioned adjacent to the hole saw 330, and each of the drive projections 344 is received in the respective opening 334 in the hole saw 330 to preclude the unthreading and decoupling of the hole saw 330 from the arbor 310 and to fix the hole saw 330 to the arbor 310. In the first position, the pilot drill bit 1400 is fixed or retained in the second coupling portion 318 by the retention member 349 received in the retention passage 348 defined in the shaft portion 311 of the arbor 310. The retention member 349 engages the first recess 1425 to restrict axial movement of the pilot drill bit 1400 relative to the arbor 310. In the first position, radial movement of the retention member 349 is prevented by the position of an inner peripheral surface of the sleeve 340, and thus the retention member 349 remains engaged in the first recess 1425, thus preventing release of the pilot drill bit 1400.

An external pulling or sliding motion may be exerted on the sleeve 340 to move the sleeve 340 from the first position shown in FIG. 15A to the second position shown in FIG. 15B. In the second position, the ball 345 of each of the detents 342 is now biased, or urged into the second recess 315B in response to the biasing force exerted on each ball 345 by the respective spring 343 to maintain the second position of the sleeve 340 relative to the shaft portion 311 of the arbor 310. In the second position, each of the drive projections 344 has been removed from the respective opening 334 in the hole saw 330, allowing the hole saw 330 to be decoupled from the threaded coupling portion 316 of the arbor 310, and allowing for removal and/or replacement of the hole saw 330 from the arbor 310. In the second position, the pilot drill bit 1400 remains fixed in the second coupling portion 318 by the engagement of the retention member 349 in the first recess 1425, with radial movement of the retention member 349 being restricted by the inner peripheral surface of the sleeve 340. Thus, in the second position, the hole saw 330 can be removed and/or replaced from the arbor 310 independently from the pilot drill bit 1400.

An external pulling or sliding force or motion may be exerted on the sleeve 340 to move the sleeve 340 from the second position shown in FIG. 15B to the third position shown in FIGS. 15C(1) and 15C(2) (or from the first position shown in FIG. 15A, through the second position, to the third position shown in FIGS. 15C(1) and 15C(2)). In the third position, the ball 345 of each of the detents 342 is now biased into the third recess 315C in response to the biasing force exerted by the respective spring 343 to maintain the third position of the sleeve 340 relative to the shaft portion 311 of the arbor 310. In this third position, each of the drive projections 344 remains removed from the respective opening 334 in the hole saw 330, allowing for removal and/or replacement of the hole saw 330 as described above. In the third position, alignment of the cutaway portion 341 of the sleeve 340 with the retention passage 348 allows the retention member 349 to move radially in the retention passage 348 and out of the first recess 1425 formed in the pilot drill bit 1400, thus releasing the pilot drill bit 1400 for axial movement out of the second coupling portion 318.

In the example arrangement shown in FIGS. 15A-15D, an auxiliary retention device may retain the pilot drill bit 1400 in the second coupling portion 318 of the shaft portion 311 of the arbor 310 until the operator pulls on the pilot drill bit 1400 to remove the pilot drill bit 1400 from the arbor 310, so that the pilot drill bit 1400 does not fall out of the second coupling portion 318 when the retention member 349 is disengaged from the first recess 1425. The auxiliary retention device may include a pilot bit detent ball 1510 received in a passage 1520 formed in an axial sidewall of the shaft portion 311 of the arbor 310. The pilot bit detent ball 1510 may be biased radially inward by a spring 1530 and a spacer 1540, so that the pilot bit detent ball 1510 engages the second recess 1435 in the pilot drill bit 1400. This engagement of the pilot bit detent ball 1510 in the second recess 1435, after the retention member 349 is disengaged from the first recess 1425, retains the pilot drill bit 1400 in the arbor 310 until the operator pulls the pilot drill bit 1400 from the arbor 310 to intentionally remove the pilot drill bit 1400 from the arbor 310. That is, the biasing force maintaining the engagement of the pilot bit detent ball 1510 in the second recess 1435 may be sufficient to hold the pilot drill bit 1400 in the arbor 310, and may be overcome by a manual force applied by the user to remove the pilot drill bit 1400.

In the example described above, a biasing force exerted by the springs 343 biases the balls 345 into one of the recesses 315A, 315B, 315C to maintain the sleeve 340 in the first position, the second position or the third position relative to the shaft portion 311 of the arbor 310. In some implementations, the outer surface of the shaft portion 311 of the arbor 310 may be configured with the first and second recesses 315A, 315B, but not the third recess 315C. In this configuration, without the engagement of the pins in a corresponding groove in the third position, the operator would instead hold the sleeve 340 in the third position. This may preclude inadvertent movement of the sleeve 340 to the third position and/or inadvertent release of a pilot drill bit held in the arbor 310.

As shown in FIGS. 15C(1) and 15C(2), in some examples, a set screw 1550 may extend through the shaft portion 311 of the arbor 310 to engage the flat portion 1440 of the pilot drill bit 1400. Engagement of the set screw 1550 against the flat portion 1440 of the pilot drill bit 1400 may restrict rotation of the pilot drill bit 1400 received in the second coupling portion 318 of the arbor 310. In the example arrangement shown in FIGS. 15C(1) and 15C(2), engagement of the set screw 1550 against the flat portion 1440 of the pilot drill bit 1400 does not necessarily inhibit axial removal of the pilot drill bit 1400 from the arbor 310 once the retention member 349 has been disengaged from the recess 1425 as described above.

In some examples, an interior geometry of the second coupling portion 318 may interact with, or mate with the flat portion 1440 of the pilot drill bit 1400 to restrict rotation of the pilot drill bit 1400 in the second coupling portion 318. For example, the interior geometry of the of the second coupling portion 318 may include a non-arcuate, or non-circular portion, for example, a flat portion, that interacts with, or mates with the flat portion 1440 of the pilot drill bit 1400 to restrict rotation of the pilot drill bit 1400 in the second coupling portion 318. Positioning of the flat portion 1440 of the pilot drill bit 1400 against the non-circular portion, or flat portion, of the second coupling portion 318 may provide an anti-rotation feature that restricts rotation of the pilot drill bit 1400 inserted in the second coupling portion 318. The non-circular portion, or flat portion formed on the interior surface of the second coupling portion 318 may also provide for indexing of the pilot drill bit 1400 as it is inserted into the second coupling portion 318. Engagement of the non-circular portion, or flat portion of the second coupling portion 318 against the flat portion 1440 of the pilot drill bit 1400 does not necessarily inhibit axial removal of the pilot drill bit 1400 from the arbor 310 once the retention member 349 has been disengaged from the recess 1425 as described above.

In the following, some examples are described.

Example 1: A quick change hole cutting accessory may include an arbor moveable without use of an external tool among a first configuration, a second configuration, and a third configuration; an annular hole saw configured to be releasably coupled to the arbor; and a pilot drill bit configured to be releasably coupled to the arbor. In the first configuration of the arbor, both the hole saw and the pilot drill bit are fixedly coupled to the arbor. In the second configuration of the arbor, one of the hole saw or the pilot drill bit is releasable from the arbor while the other of the hole saw or the pilot bit remains fixedly coupled to the arbor. In the third configuration of the arbor, the other of the hole saw or the pilot drill bit is releasable from the arbor.

Example 2: The quick change hole cutting accessory as in Example 1, wherein the arbor may include a shaft portion extending along an axis; a sleeve movably coupled to the shaft portion; a plurality of recesses defined in one of the shaft portion or the sleeve; and a detent coupled to the other of the shaft portion or the sleeve and configured to selectively engage the plurality of recesses upon movement of the sleeve relative to the shaft portion. In a first position of the sleeve relative to the shaft portion corresponding to the first configuration of the arbor, the detent engages a first recess of the plurality of recesses. In in a second position of the sleeve relative to the shaft portion corresponding to the second configuration of the arbor, the detent engages a second recess of the plurality of recesses. In a third position of the sleeve relative to the shaft portion corresponding to the third configuration of the arbor, the detent engages a third recess of the plurality of recesses.

Example 3: The quick change hole cutting accessory as in Example 2, wherein the detent may be movable from an engaged position with the first recess to an engaged position with the second recess in response to a first axial movement of the sleeve from the first position to the second position along the shaft portion of the arbor.

Example 4: The quick change hole cutting accessory as in Example 3, wherein the detent may be moveable from the engaged position with the second recess to an engaged position with the third recess in response to a second axial movement of the sleeve from the second position to the third position on the shaft portion of the arbor.

Example 5: The quick change hole cutting accessory as in Example 4, wherein the first recess, the second recess, and the third recess are spaced axially along a line parallel to the axis.

Example 6: The quick change hole cutting accessory as in Example 3, wherein the detent is moveable from the engaged position with the second recess to an engaged position with the third recess in response to a second rotational movement of the sleeve from the second position to the third position about the shaft portion of the arbor.

Example 7: The quick change hole cutting accessory as in Example 6, wherein the first recess and the second recess are spaced axially along a line parallel to the axis and the second recess and the third recess are spaced circumferentially about the axis.

Example 8: The quick change hole cutting accessory as in Example 1, wherein the arbor may include a shaft portion extending along an axis with an axial bore defined configured to receive the pilot drill bit; and a sleeve received over the shaft portion and moveable among a first position relative to the shaft corresponding to the first configuration, a second position relative to the shaft corresponding to the second configuration, and a third position relative to the shaft corresponding to the third configuration.

Example 9: The quick change hole cutting accessory as in Example 8, wherein the shaft may include a threaded front end portion configured to be received in a threaded opening in the hole saw. In the first position of the sleeve on the shaft portion of the arbor, the threaded front end portion is received in the threaded opening in the hole saw so as to rotationally drive the hole saw upon rotation of the arbor. In at least one of the second position or the third position of the sleeve relative the arbor, the at least one hole saw may be unthreaded from the front end portion to remove the hole saw from the arbor.

Example 10: The quick change hole cutting accessory as in Example 8, wherein the sleeve may include at least one drive projection extending axially from the sleeve, wherein the at least one drive projection is configured to be selectively received in a corresponding opening in the hole saw. In the first position of the sleeve on the shaft portion of the arbor, the at least one drive projection is received in the corresponding opening in the hole saw so as to rotationally drive the hole saw upon rotation of the arbor. In at least one of the second position or the third position of the sleeve relative the arbor, the at least one drive projection is released from the corresponding opening in the hole saw.

Example 11: The quick change hole cutting accessory as in Example 8, also including a retention passage radially formed in the shaft portion and in communication with the bore; and a retention member positioned in the retention passage and configured to selectively engage the pilot drill bit to retain the pilot drill bit in the bore.

Example 12: The quick change hole cutting accessory as in Example 11, wherein, in the first position of the sleeve on the shaft portion of the arbor, the retention member is engaged with the pilot drill bit so as to retain the pilot drill bit in the bore of the arbor; and in at least one of the second or third position of the sleeve on the shaft portion of the arbor, the retention member is moveable radially outward in the retention passage and disengagable from the pilot drill bit such that the pilot drill bit is releasable from the arbor.

Example 13: The quick change hole cutting accessory as in Example 12, wherein the pilot drill bit includes at least one retention recess releasably engagable by the retention member to retain the drill bit in the axial bore when the sleeve is in at least two of the first position, the second position, and the third position.

Example 14: The quick change hole cutting accessory as in Example 13, wherein the pilot drill bit includes a non-circular shank portion configured to be engaged by a non-circular portion of the axial bore to transmit rotational torque from the shaft to the pilot drill bit.

Example 15: The quick change hole cutting accessory as in Example 14, wherein the non-circular shank portion comprises a flat and the non-circular portion of the axial bore includes a set screw configured to engage the flat.

Example 16: The quick change hole cutting accessory as in Example 8, also including a threaded coupler that is threadably coupled to an outer circumferential portion of the shaft portion of the arbor. In a first position of the threaded coupler retains the first position of the sleeve on the shaft portion of the arbor. Rotation of the threaded coupler in a first rotational direction relative to the shaft portion of the arbor moves the threaded coupler axially along the shaft portion of the arbor, in a direction away from the sleeve, such that the sleeve is axially movable from the first position to the second position and the third position relative to the shaft portion of the arbor.

Example 17: An arbor for a quick change hole cutting accessory may include a shaft including a first coupling portion configured to have a hole saw releasably coupled thereto and a second coupling portion configured to have a pilot drill bit releasably coupled thereto; and a sleeve movably coupled to the shaft. In a first position of the sleeve relative to the shaft, both the hole saw and the pilot drill bit may be configured to be fixedly coupled to the arbor. In a second position of the sleeve on the shaft, one of the hole saw or the pilot drill bit may be configured to be releasable from the arbor without use of an external tool. In a third position of the sleeve on the shaft, the other of the hole saw and the pilot drill bit may be configured to be releasable from the arbor without use of an external tool.

Example 18: The arbor as in Example 17, also including a plurality of recesses defined in one of the shaft portion or the sleeve; and a detent coupled to the other of the shaft portion or the sleeve and configured to selectively engage the plurality of recesses upon movement of the sleeve relative to the shaft portion. In the first position of the sleeve, the detent engages a first recess of the plurality of recesses. In the second position of the sleeve, the detent engages a second recess of the plurality of recesses. In the third position of the sleeve, the detent engages a third recess of the plurality of recesses.

Example 19: A pilot drill bit for use with a hole saw accessory may include a shank portion configured to be alternately received in a first bore of a first arbor or a second bore in a second arbor, each of the first arbor and the second arbor configured to be releasably coupled to a hole saw. The shank portion may include a non-circular portion with a flat surface configured to be engaged by a set screw in the first arbor to releasably retain the pilot drill bit in the first bore of the first arbor; a recess configured to be engaged by a retention member in the second arbor to releasably retain the pilot drill bit in the second bore of the second arbor; and a fluted cutting portion extending from the shank portion.

Example 20: The pilot bit as in Example 19, wherein the flat surface may also be configured to be engaged by a non-circular surface in the second bore of the second arbor to transmit rotational torque from the second arbor to the drill bit.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A quick change hole cutting accessory, including:
   an arbor moveable without use of an external tool among a first configuration, a second configuration, and a third configuration, the arbor including:
   a shaft portion extending along an axis;
   a sleeve movably coupled to the shaft portion;
   a plurality of recesses defined in one of the shaft portion or the sleeve; and
   a detent coupled to the other of the shaft portion or the sleeve and configured to selectively engage the plurality of recesses upon movement of the sleeve relative to the shaft portion;
   an annular hole saw configured to be releasably coupled to the arbor; and
   a pilot drill bit configured to be releasably coupled to the arbor,
   wherein
   in a first position of the sleeve relative to the shaft portion corresponding to the first configuration of the arbor, the detent engages a first recess of the plurality of recesses, and both the hole saw and the pilot drill bit are fixedly coupled to the arbor;
   in a second position of the sleeve relative to the shaft portion corresponding to the second configuration of the arbor, the detent engages a second recess of the plurality of recesses, and one of the hole saw or the pilot drill bit is releasable from the arbor while the other of the hole saw or the pilot drill bit remains fixedly coupled to the arbor; and
   in a third position of the sleeve relative to the shaft portion corresponding to the third configuration of the arbor, the detent engages a third recess of the plurality of recesses, and the other of the hole saw or the pilot drill bit is releasable from the arbor.

2. The quick change hole cutting accessory of claim 1, wherein the detent is movable from an engaged position with the first recess to an engaged position with the second recess in response to a first axial movement of the sleeve from the first position to the second position along the shaft portion of the arbor.

3. The quick change hole cutting accessory of claim 2, wherein the detent is moveable from the engaged position with the second recess to an engaged position with the third recess in response to a second axial movement of the sleeve from the second position to the third position on the shaft portion of the arbor.

4. The quick change hole cutting accessory of claim 3, wherein the first recess, the second recess, and the third recess are spaced axially along a line parallel to the axis.

5. The quick change hole cutting accessory of claim 2, wherein the detent is moveable from the engaged position with the second recess to an engaged position with the third recess in response to a second rotational movement of the sleeve from the second position to the third position about the shaft portion of the arbor.

6. The quick change hole cutting accessory of claim 5, wherein the first recess and the second recess are spaced axially along a line parallel to the axis and the second recess and the third recess are spaced circumferentially about the axis.

7. The quick change hole cutting accessory of claim 1, further comprising:
    an axial bore defined in the shaft portion and configured to receive the pilot drill bit.

8. The quick change hole cutting accessory of claim 7, wherein the shaft portion includes a threaded front end portion configured to be received in a threaded opening in the hole saw, wherein
    in the first position of the sleeve relative to the shaft portion of the arbor, the threaded front end portion is received in the threaded opening in the hole saw so as to rotationally drive the hole saw upon rotation of the arbor; and
    in at least one of the second position or the third position of the sleeve relative to the arbor, the hole saw is unthreadable from the front end portion to remove the hole saw from the arbor.

9. The quick change hole cutting accessory of claim 7, wherein the sleeve includes at least one drive projection extending axially from the sleeve, wherein the at least one drive projection is configured to be selectively received in a corresponding opening in the hole saw, wherein
    in the first position of the sleeve relative to the shaft portion of the arbor, the at least one drive projection is received in the corresponding opening in the hole saw so as to rotationally drive the hole saw upon rotation of the arbor; and
    in at least one of the second position or the third position of the sleeve relative to the arbor, the at least one drive projection is released from the corresponding opening in the hole saw.

10. The quick change hole cutting accessory of claim 7, further comprising:
    a retention passage radially formed in the shaft portion and in communication with the bore; and
    a retention member positioned in the retention passage and configured to selectively engage the pilot drill bit to retain the pilot drill bit in the bore.

11. The quick change hole cutting accessory of claim 10, wherein
    in the first position of the sleeve relative to the shaft portion of the arbor, the retention member is engaged with the pilot drill bit so as to retain the pilot drill bit in the bore of the arbor; and
    in at least one of the second position or the third position of the sleeve relative to the shaft portion of the arbor, the retention member is moveable radially outward in the retention passage and disengagable from the pilot drill bit such that the pilot drill bit is releasable from the arbor.

12. The quick change hole cutting accessory of claim 11, wherein the pilot drill bit includes at least one retention recess releasably engageable by the retention member to retain the pilot drill bit in the axial bore when the sleeve is in at least two of the first position, the second position, and the third position.

13. The quick change hole cutting accessory of claim 12, wherein the pilot drill bit includes a non-circular shank portion configured to be engaged by a non-circular portion of the axial bore to transmit rotational torque from the shaft portion to the pilot drill bit.

14. The quick change hole cutting accessory of claim 13, wherein the non-circular shank portion comprises a flat and the non-circular portion of the axial bore includes a set screw configured to engage the flat.

15. The quick change hole cutting accessory of claim 7, further comprising an adapter coupled to the hole saw and positioned on the shaft portion of the arbor between the sleeve and the hole saw, wherein
    in the first position of the sleeve relative to the shaft portion of the arbor, at least one protrusion extending axially from the sleeve is received in a corresponding slot in the adapter so as to fix a position of the hole saw relative to the arbor; and
    in the second position of the sleeve relative to the arbor, the at least one protrusion is released from the corresponding slot in adapter, such that the hole saw is removable from the arbor.

16. The quick change hole cutting accessory of claim 7, further comprising a threaded coupler that is threadably coupled to an outer circumferential portion of the shaft portion of the arbor, wherein
    a first position of the threaded coupler retains the first position of the sleeve on the shaft portion of the arbor; and
    rotation of the threaded coupler in a first rotational direction relative to the shaft portion of the arbor moves the threaded coupler axially along the shaft portion of the arbor, in a direction away from the sleeve, such that the sleeve is axially movable from the first position to the second position and the third position relative to the shaft portion of the arbor.

17. The quick change hole cutting accessory of claim 1, wherein
    the shaft portion of the arbor includes a first coupling portion configured to have the hole saw releasably coupled thereto and a second coupling portion configured to have the pilot drill bit releasably coupled thereto.

18. The quick change hole cutting accessory of claim 1, wherein the pilot drill bit comprises:
    a shank portion configured to be alternately coupled to a first arbor or a second arbor, the shank portion comprising:
        a non-circular portion with a flat surface configured to be engaged by a set screw of the first arbor to releasably retain the pilot drill bit in the first arbor; and
        a recess configured to be engaged by a retention member of the second arbor to releasably retain the pilot drill bit in the second arbor; and a fluted cutting portion extending from the shank portion.

* * * * *